(12) United States Patent
Ho et al.

(10) Patent No.: US 11,772,235 B2
(45) Date of Patent: Oct. 3, 2023

(54) MEDIA DOSAGE UNIT FOR SHOT PEENING, METHOD OF USING THE UNIT FOR SHOT PEENING AND METHOD OF MAKING THE UNIT

(71) Applicant: ABRASIVE ENGINEERING PTE LTD, Singapore (SG)

(72) Inventors: Teck Hwa Ho, Singapore (SG); Yuet Kwan Lim, Singapore (SG); Chong Wei Lee, Singapore (SG); Keng Huat Tan, Singapore (SG); Hin Cheong Lee, Singapore (SG); Yusong Meng, Singapore (SG); Qi Ming Alex Goh, Singapore (SG)

(73) Assignee: ABRASIVE ENGINEERING PTE LTD, Singapore (SG)

( * ) Notice: Subject to any disclaimer, the term of this patent is extended or adjusted under 35 U.S.C. 154(b) by 34 days.

(21) Appl. No.: 16/965,601

(22) PCT Filed: Feb. 27, 2019

(86) PCT No.: PCT/SG2019/050109
§ 371 (c)(1),
(2) Date: Jul. 29, 2020

(87) PCT Pub. No.: WO2019/168472
PCT Pub. Date: Sep. 6, 2019

(65) Prior Publication Data
US 2021/0046611 A1    Feb. 18, 2021

(30) Foreign Application Priority Data

Feb. 28, 2018   (SG) .......................... 10201801657U

(51) Int. Cl.
*B24C 7/00* (2006.01)
*B24C 1/10* (2006.01)

(52) U.S. Cl.
CPC .............. *B24C 7/0053* (2013.01); *B24C 1/10* (2013.01)

(58) Field of Classification Search
CPC .......... B24C 1/10; B24C 7/0053; B24C 7/00; B24C 7/0069; B24C 1/00; B24C 5/02;
(Continued)

(56) References Cited

U.S. PATENT DOCUMENTS 5,365,762 A * 11/1994 Thompson ............ B24C 7/0053
451/39
5,556,324 A * 9/1996 Shank, Jr. ................. B24C 9/00
451/87
(Continued)

FOREIGN PATENT DOCUMENTS

CN          105171617 A  * 12/2015  ............... B24C 3/02
JP         2017213651 A  * 12/2017  ............. B24C 11/00

*Primary Examiner* — Kristina N Junge
*Assistant Examiner* — Robert F Neibaur
(74) *Attorney, Agent, or Firm* — Idea Intellectual Limited; Margaret A. Burke; Sam T. Yip

(57) ABSTRACT

The present application provides to a media dosage unit (300) for shot peening. The application also presents methods of using and making the media dosage unit. The media dosage unit comprises a flow sensor (304) for measuring flow rate of solid particles; and a connector on the flow sensor for coupling the flow sensor to a shot circulation conduit (306). The present application also relates to a media flow valve (316) for the media dosage unit for shot peening. The application additionally discloses a method of making or assembling the microwave media flow sensor.

9 Claims, 16 Drawing Sheets

(58) Field of Classification Search
CPC .......... B24C 7/0015; B24C 9/00; G01F 1/74; G05D 7/0605; G01P 13/0006; Y10T 29/479
USPC ............... 72/53; 451/38, 2, 101, 60, 93, 99; 29/90.7
See application file for complete search history.

(56) References Cited

U.S. PATENT DOCUMENTS

| | | | | |
|---|---|---|---|---|
| 5,613,895 A | * | 3/1997 | Baker | ............... G01F 1/74 451/99 |
| 2014/0220861 A1 | * | 8/2014 | Champaigne | ............ B24C 7/00 451/2 |

* cited by examiner

| Regular Hardness | | | | | High Hardness | | | | |
|---|---|---|---|---|---|---|---|---|---|
| | | SHAPE REQUIREMENTS | | | | | SHAPE REQUIREMENTS | | |
| Shot Size | Area per Field Square Inch (mm$^2$) | Number of Fields Viewed | Number of Marginal Particles max (1) | Number of Unacceptable Particles max (2) | Shot Size | Area per Field Square Inch (mm$^2$) | Number of Fields Viewed | Number of Marginal Particles All Fields (1) max | Number of Unacceptable Particles, All Fields (2), max |
| ASR 930 | 1 (645) | 1 | 6 | 2 | ASH 930 | 1 (645) | 1 | 8 | 2 |
| ASR 780 | 1 (645) | 1 | 12 | 2 | ASH 780 | 1 (645) | 1 | 12 | 2 |
| ASR 660 | 1 (645) | 1 | 16 | 3 | ASH 660 | 1 (645) | 1 | 16 | 3 |
| ASR 550 | 1 (645) | 1 | 20 | 4 | ASH 550 | 1 (645) | 1 | 20 | 4 |
| ASR 460 | 1 (645) | 1 | 28 | 5 | ASH 460 | 1 (645) | 1 | 28 | 5 |
| ASR 390 | 1 (645) | 1 | 39 | 7 | ASH 390 | 1 (645) | 1 | 39 | 7 |
| ASR 330 | 0.25 (161) | 1 | 14 | 3 | ASH 330 | 0.25 (161) | 1 | 14 | 3 |
| ASR 280 | 0.25 (161) | 1 | 20 | 4 | ASH 280 | 0.25 (161) | 1 | 20 | 4 |
| ASR 230 | 0.25 (161) | 1 | 14 | 5 | ASH 230 | 0.25 (161) | 1 | 14 | 5 |
| ASR 190 | 0.25 (161) | 1 | 20 | 7 | ASH 190 | 0.25 (161) | 1 | 20 | 7 |
| ASR 170 | 0.25 (161) | 1 | 28 | 10 | ASH 170 | 0.25 (161) | 1 | 28 | 10 |
| ASR 130 | 0.0625 (40) | 1 | 10 | 4 | ASH 130 | 0.0625 (40) | 1 | 10 | 4 |
| ASR 110 | 0.0625 (40) | 1 | 14 | 5 | ASH 110 | 0.0625 (40) | 1 | 14 | 5 |
| ASR 70 | 0.0625 (40) | 1 | 39 | 13 | ASH 70 | 0.0625 (40) | 1 | 39 | 13 |

Fig. 3

SHAPE REQUIREMENTS

| Shot Size | Area per Field Square Inches (mm$^2$) | Number of Fields Viewed | Number of Marginal Particles All Fields max(1) | Number of Unacceptable Particles All Fields max(2) |
|---|---|---|---|---|
| AWCH 116 | 1 (645) | 3 | 7 | 2 |
| AWCH 96 | 1 (645) | 2 | 7 | 2 |
| AWCH 80 | 1 (645) | 2 | 10 | 3 |
| AWCH 62 | 1 (645) | 9 | 63 | 2 |
| AWCH 54 | 1 (645) | 7 | 66 | 2 |
| AWCH 47 | 1 (645) | 5 | 68 | 2 |
| AWCH 41 | 1 (645) | 4 | 70 | 2 |
| AWCH 35 | 0.25 (161) | 14 | 67 | 2 |
| AWCH 32 | 0.25 (161) | 12 | 60 | 2 |
| AWCH 28 | 0.25 (161) | 7 | 67 | 2 |
| AWCH 23 | 0.25 (161) | 5 | 70 | 2 |
| AWCH 20 | 0.25 (161) | 4 | 76 | 2 |
| AWCH 17 | 0.0625 (40) | 11 | 70 | 2 |
| AWCH 14 | 0.0625 (40) | 6 | 60 | 2 |
| AWCH 12 | 0.0625 (40) | 5 | 68 | 2 |

Fig. 4

SHAPE REQUIREMENTS

| Shot Size | Area per Field Square Inch (mm$^2$) | Number of Fields Viewed | Number of Marginal Particles All Fields max(1) | Number of Unacceptable Particles All Fields max(2) |
|---|---|---|---|---|
| AWCR 116 | 1 (645) | 3 | 7 | 2 |
| AWCR 96 | 1 (645) | 2 | 7 | 2 |
| AWCR 80 | 1 (645) | 2 | 10 | 3 |
| AWCR 62 | 1 (645) | 9 | 63 | 2 |
| AWCR 54 | 1 (645) | 7 | 66 | 2 |
| AWCR 47 | 1 (645) | 5 | 68 | 2 |
| AWCR 41 | 1 (645) | 4 | 70 | 2 |
| AWCR 35 | 0.25 (161) | 14 | 67 | 2 |
| AWCR 32 | 0.25 (161) | 12 | 60 | 2 |
| AWCR 28 | 0.25 (161) | 7 | 67 | 2 |
| AWCR 23 | 0.25 (161) | 5 | 70 | 2 |
| AWCR 20 | 0.25 (161) | 4 | 76 | 2 |
| AWCR 17 | 0.0625 (40) | 11 | 70 | 2 |
| AWCR 14 | 0.0625 (40) | 6 | 60 | 2 |
| AWCR 12 | 0.0625 (40) | 5 | 68 | 2 |

Fig. 5

PEENING BALLS

| Nominal Size | Minimum Case Depth Inch Type 1 | Minimum Case Depth Millimeters Type 1 | Maximum Case Depth Inch Type 1 | Maximum Case Depth Millimeters Type 1 | Size Tolerance plus and minus Inch Type 1&2 | Size Tolerance plus and minus Millimeter Type 1&2 |
|---|---|---|---|---|---|---|
| APB 3/32 | 0.020 | 0.51 | 0.025 | 0.64 | 0.008 | 0.20 |
| APB 1/8 | 0.025 | 0.64 | 0.030 | 0.76 | 0.010 | 0.25 |
| APB 3/16 | 0.030 | 0.76 | 0.035 | 0.89 | 0.010 | 0.25 |
| APB 7/32 | 0.035 | 0.89 | 0.040 | 1.02 | 0.010 | 0.25 |
| APB 1/4 | 0.045 | 1.14 | 0.055 | 1.40 | 0.010 | 0.25 |
| APB 3/8 | 0.055 | 1.40 | 0.065 | 1.65 | 0.010 | 0.25 |
| APB 7/16 | 0.065 | 1.65 | 0.075 | 1.90 | 0.010 | 0.25 |

Fig. 6

GLASS SHOT FOR PEENING

| Designation Number | U.S. Sieve | Diameter Inch Max | Diameter Inch Min | Max % Trace Retain | U.S. Sieve Size Min 95% Pass | U.S. Sieve Size Max 15% Pass | Max 5% Pass | Min % True Spheres | Max % Sharp Particle | Millimeters Max | Millimeters Min |
|---|---|---|---|---|---|---|---|---|---|---|---|
| AGB-200 | | -8+ 12 | 0.094 | 0.066 | 7 | 8 | 12 | 14 | 85 | 0.5 | 2.39 | 1.68 |
| AGB-170 | | -10+ 14 | 0.079 | 0.056 | 8 | 10 | 14 | 16 | 85 | 0.5 | 2.01 | 1.42 |
| AGB-150 | 9954A -1 | -12+ 14 | 0.066 | 0.047 | 10 | 12 | 14 | 20 | 85 | 0.5 | 1.68 | 1.41 |
| AGB-100 | 9954A -2 | -14+ 20 | 0.0555 | 0.0331 | 12 | 14 | 20 | 30 | 85 | 3.0 | 1.41 | 0.841 |
| AGB-70 | 9954A -3 | -20+ 30 | 0.0331 | 0.0234 | 18 | 20 | 30 | 40 | 65 | 3.0 | 0.841 | 0.594 |
| AGB-50 | 9954A -4 | -30+ 40 | 0.0234 | 0.0165 | 25 | 30 | 40 | 45 | 75 | 3.0 | 0.594 | 0.419 |
| AGB-35 | 9954A -5 | -40+ 50 | 0.0165 | 0.0117 | 35 | 40 | 50 | 60 | 70 | 3.0 | 0.419 | 0.297 |
| AGB-30 | | -45+ 50 | 0.0139 | 0.0098 | 40 | 45 | 60 | 70 | 70 | 3.0 | 0.358 | 0.249 |
| AGB-25 | 9954A -6 | -50+ 70 | 0.0117 | 0.0083 | 45 | 50 | 70 | 80 | 80 | 3.0 | 0.297 | 0.211 |
| AGB-20 | 9954A -7 | -60+ 80 | 0.0098 | 0.0079 | 50 | 60 | 80 | 100 | 80 | 3.0 | 0.249 | 0.179 |
| AGB-18 | 9954A -8 | -70+100 | 0.0083 | 0.0059 | 60 | 70 | 100 | 120 | 85 | 3.0 | 0.211 | 0.150 |
| AGB-15 | 9954A -9 | -80+120 | 0.0070 | 0.0049 | 70 | 80 | 120 | 140 | 80 | 3.0 | 0.178 | 0.124 |
| AGB-12 | 9954A -10 | -100+170 | 0.0059 | 0.0035 | 80 | 100 | 170 | 200 | 85 | 3.0 | 0.150 | 0.089 |
| AGB-10 | 9954A -11 | -120+200 | 0.0049 | 0.0029 | 100 | 120 | 200 | 230 | 90 | 3.0 | 0.125 | 0.074 |
| AGB-8 | 9954A -12 | -140+230 | 0.0041 | 0.0025 | 120 | 140 | 230 | 325 | 90 | 3.0 | 0.104 | 0.064 |
| AGB-6 | 9954A -13 | -170+325 | 0.0035 | 0.0017 | 140 | 170 | 325 | 400 | 90 | 3.0 | 0.089 | 0.043 |

NOTE: 1. Designation number is mean shot diameter in microns divided by 10.

Fig. 7

CERAMIC SHOT FOR PEENING – SIZES AND SPHERICITY

| Designation | Nominal Sizes, Millimeters | Nominal Sizes, Inch | Nominal Sizes, Mesh | Sieve Size, Millimeters Maximum 0.5% Retained | Sieve Size, Millimeters Maximum 5% Retained | Sieve Size, Millimeters Maximum 10% Passing | Sieve Size, Millimeters Maximum 3% Passing | Minimum % of Shot W/Sphericity 0.8 and Above (True Spheres) | Maximum Number of Shot with Sphericity Below 0.5 Acceptable per Square Centimeter | Number Broken or Angular Beads Acceptable per Square Centimeter |
|---|---|---|---|---|---|---|---|---|---|---|
| AZB850 | 0.85/1.18 | 0.033/0.047 | 16/20 | 1.400 | 1.180 | 0.850 | 0.710 | 65 | 4 | 2 |
| AZB600 | 0.60/0.85 | 0.024/0.033 | 20/30 | 1.000 | 0.850 | 0.600 | 0.425 | 65 | 8 | 4 |
| AZB425 | 0.425/0.6 | 0.017/0.024 | 30/40 | 0.710 | 0.600 | 0.425 | 0.300 | 70 | 14 | 8 |
| AZB300 | 0.300/0.425 | 0.012/0.017 | 40/50 | 0.500 | 0.425 | 0.300 | 0.250 | 70 | 27 | 15 |
| AZB210 | 0.212/0.300 | 0.008/0.012 | 50/70 | 0.355 | 0.300 | 0.212 | 0.180 | 80 | 55 | 20 |
| AZB150 | 0.150/0.212 | 0.006/0.008 | 70/100 | 0.250 | 0.212 | 0.150 | 0.125 | 80 | 300 | 65 |
| AZB106 | 0.100/0.150 | 0.004/0.006 | 100/140 | 0.180 | 0.150 | 0.106 | 0.063 | 80 | 600 | 90 |

Fig. 8

MEDIA DOSAGE UNIT FOR SHOT PEENING, METHOD OF USING THE UNIT FOR SHOT PEENING AND METHOD OF MAKING THE UNIT

This application is a 371 application of the International Patent Application No. PCT/SG2019/050109 filed on Feb. 27, 2019, which claims priority from Singapore patent application number 10201801657U filed Feb. 28, 2018, and the disclosures of which are incorporated herein by reference in their entirety.

The present application relates to a media dosage unit for shot peening. The application also relates to methods of using, making or assembling, and maintaining the media dosage unit. More specifically, the present application also relates to a media flow valve for the media dosage unit for shot peening. The application also relates to a method of making or assembling the media flow valve.

Shot peening is a cold work process used to treat a surface of an object (e.g. metal part) to prevent fatigue and stress corrosion failures, and prolong product life of the object. In shot peening, small spherical shots or particles are accelerated and then bombard the surface for finishing. The small spherical shots act like a peen hammer dimpling the surface. As the small spherical shots continue to strike the object, the small spherical shots produce multiple overlapping dimples throughout the surface and cause compression stress by multiple overlapping dimples on the surface. Compression stress at the surface (known as surface compression stress) strengthens the object, ensuring that finished object is able to resist fatigue, corrosion, cracking, galling and erosion from surface cavitation. Shot peening is an economical and effective method of producing and making residual surface compression stress in order to increase lifespan of the object. Shot peening is also used for hardening the object to improve wearing characteristics, and to straighten distortions and surface texturing. The object allows a lighter weight structure that exhibits high wearing and fatigue resistance.

According to materials of the object, the small spherical shots or particles (also known as shots or shot particles) are classified into two categories: ferrous shots and non-ferrous shots. Traditionally, chilled iron is used for peening ferrous objects such as carburized parts or tool steels (60 Rc), since hardness of chilled iron (63 Rc) is equal to or greater than hardness of the object. In addition, cut wire shots or clipped wire shots are also used for some special requirements. Cut wire shots or clipped wire shots are usually prepared by clipping off short lengths of steel wires and then being blasted against scrap steel for rounding out sharp edges. Non-ferrous metals can only be peened with non-ferrous shots such as glass, plastics, aluminum or the alike. If peened with steel or iron shots, non-ferrous metals would be damaged by electrolytic corrosion resulting from embedded iron particles.

Essential features of relevant inventions are provided by one or more independent claims, whilst advantageous features of these inventions are presented by their dependent claims respectively.

According to a first aspect, the present application provides a media dosage unit that comprises a flow sensor (also known as solid flow sensor or flow meter) for measuring flow rate of solid particles, which are alternatively known as shot particles, shot peening particles, shot streams or shots. The media dosage unit further comprises a permeant or detachable connector (e.g. externally or internally threaded nut or tube) on the flow sensor for coupling the flow sensor to a shot circulation conduit or circulation conduit. In particular, the flow sensor comprises a microwave flow sensor that is applicable or suitable for both non-ferrous and ferrous shots. Hence, the media dosage unit may be conveniently termed microwave media dosage unit accordingly.

In the media dosage unit, the flow sensor, solid flow sensor or flow meter is used for measuring a flow rate of either non-ferrous or ferrous solid particles. The flow sensor can be an optical flow sensor (e.g. Laser Doppler flow meter), a mechanical flow meter, an Acoustic Doppler Velocimetry meter, a Mass Airflow (MAF) sensor, a Vortex flow meter, a Sonar flow meter, an electromagnetic flow meter, an ultrasonic flow meter and a Coriolis flow meter. An example of the flow sensor has an electromagnetically controlled plunger at an orifice for regulating a media flow and a cantilever blade for measuring the media flow rate. When a power is applied, an electromagnetic force raises the plunger to allow the media to flow through a valve. The media falls past the plunger and drops onto a paddle, bending the paddle according to the media's flow rate and thereby producing an accurate flow rate signal. When the power applied is disconnected off, the plunger returns to a rest position and stops the media flow. However, a known flow sensor is only suitable for a non-ferrous media such as ceramic beads, glass beads, and sometimes Aluminum Oxide (AlOx) in either direct pressure-type (i.e. pressurized system) or suction-type (i.e. vacuum-suction system) of air blast machines. For example, the non-ferrous shots can be 100, 150, 300 and 425 of ceramic beads; and Mil #5, #6, #7, #12 and 40-60, 70-140 of glass beads.

The flow sensor optionally includes a microwave sensor. Microwave generally has frequency ranging from 300 MHz (i.e. wavelength of 1 m) to 300 GHz (i.e. wavelength of 1 mm). More specifically, microwave used for microwave sensors ranges from 1 to 100 GHz (i.e. wavelength from 0.3 m to 3 mm). Particularly, the microwave for the present application includes an entire SHF band (i.e. frequency of 3 to 30 GHz, or wavelength of 10 to 1 cm) at minimum. More particularly, the microwave sensor of the media dosage unit preferably provides microwave ranging from 18 GHz to 26.5 GHz substantially. The microwave sensor includes but is not limited to a monostatic pulsed radar, bistatic (pulsed) radar, a Doppler effect sensor, ultra-wideband (UWB) sensor with a correlator mixer, FM-CW radar sensor, transmitter-receiver sensor, microwave radio meter, microwave resonator movement sensor, a microwave resonator movement detector, a microwave noise sensor, a microwave interferometer or a combination of any of these types. For example, the Doppler Effect microwave sensor comprises a circulator and an antenna; and the circulator further has a frequency counter, a microwave receiver or receiver, and a microwave transmitter or transmitter. The Doppler Effect sensor is used for detecting a moving object simply by an unmodulated signal. The microwave transmitter, also known as generator or microwave generator, is firstly configured to provide microwave; then the transmitted signal is reflected from a moving target; and finally the receiver receives and processes the reflected signal for determining the mutual speed of the moving object. Sometimes, the transmitter and the receiver can be combined as a single component called transceiver which functions both as a transmitter and a receiver.

The media dosage unit comprises a circulation conduit (e.g. tube or pipe) where the shots flow from a shot media storage tank to a targeted work piece (i.e. object). The circulation conduit has an inlet connected to the shot media storage tank and an outlet connected directed to the targeted work piece. The circulation conduit can have various shapes and sizes according to different requirements. For example, the circulation conduit may be a cylindrical tube which has an inlet and an outlet of a same diameter. Instead, the circulation may be a conical tube where an inlet has a larger diameter than an outlet. In this way, the shots flowing inside the conical tube can be gradually focused onto the work piece. The cross-section of the circulation conduit may also be rectangular or any other shape that is best suitable for a specific working condition. In particular, the circulation conduit of the present application can be configured to have a main branch for shots flowing and one or more side branches for installing the flow sensor and maybe other optional components such as an observation window. The circulation conduit can have a flexible design for the main branch and the side branches. For example, the side branch may be connected orthogonally to the main branch. Alternatively, the side branch may also be connected to the main branches with a certain angle according to a specific need.

The circulation conduit generally is made of abrasion-resistant material that is strong enough to withstand mechanical wear with the selected shots. If ferrous shots are used such as chilled iron shots, the circulation conduit may be made of carbonized steel, or fibre-reinforced plastic; while if non-ferrous shots are adopted, tempered or toughened glass can be another choice. Meanwhile, the materials are required to have a hardness that can bear occasional collisions with the shots. In addition to the mechanical properties, the materials may also be easily processed with specific features such as one or more side branches. In particular, when the microwave flow sensor is adopted, the material for the circulation conduit is preferable to have least random reflection of microwave, and thus the circulation conduit would hardly generate a microwave signal in the environment that interferences with the reflected signal from the shots. In this way, the flow rate of shots inside the circulation conduit is precisely detected and further accurately controlled.

The media dosage unit comprises the connector on the flow sensor for either permanently or detachably coupling the flow sensor to the circulation conduit. For example, the connector may be permanently welded to the circulation conduit. Alternatively, the connector may be coupled with a clamp such that the connector can be detached from the circulation conduit when the clamp is loosened. As a matter of choice, the connector may be screwed with a nut, pinned with a bar, ties with a rope, or any other suitable method to the circulation conduit. As indicated above, the flow sensor is preferably coupled to the side branch of the circulation conduit such that the coupling process is easily conducted via the connector without changing the design of the main branch.

Particularly, a protector is attached at an interface of the flow sensor and the circulation conduit for protecting the flow sensor. For example, the protector encapsulates the flow sensor completely such that the flow sensor would not be damaged by the media shots when the media shots passing by the flow sensor. The protector should not interfere with the emitted microwave signal or reflected microwave signal. Therefore, the protector is made of a material that meets two requirements: on one hand, the material should be strong enough for resisting multiple collisions from the media shots; and on the other hand, the material should also be transparent to microwave. A suitable material for the two purposes is polyurethane (PU).

The media dosage unit optionally comprises a shot blasting or shot peening chamber where the shots are bombarded to the surface of the work piece for finishing. The shot blasting chamber may have various types of brackets for holding work pieces of different sizes and shapes such that the media dosage unit is applicable to a variety of objects of different industries. The shot blasting chamber has an entrance for the shot flowing inward. While the shot blasting chamber has an exit where the shots after bombardment with the work piece are collected and transferred automatically outside the blasting chamber during a shot peening process. In this way, the media dosage unit can work in a continuous manner; and thus the productivity of the media dosage unit is significantly enhanced and the operation cost is also reduced accordingly. The shot blasting chamber and the brackets are made of hard materials such as carbonized steel for withstanding repeated bombardment of the shots. More advantageously, the media dosage unit may comprise two or more shot blasting chambers where multiple shot peening operations can be conducted concurrently for further enhancing the productivity. Preferably, the brackets may be moveable and/or rotatable for easy operation of the shot peening process. In addition, a monitoring system may be installed in the blasting chamber for monitoring the collection of used shots. An alarm system may be also installed separately or integrated inside the monitoring device for sending out an alarm signal when the blasting chamber fails to work properly, e.g. the entrance or the exit is congested with the shots or foreign materials.

The media dosage unit may further comprise an observation window for inspecting the media dosage unit visually. The observation window is either located at the main branch or at a side branch of the circulation conduit. For the former choice, a portion of the main branch is removed and then the observation window is embedded in the main branch. In this case, the observation window is made of a transparent and meanwhile abrasion-resistant material such as tempered or toughened glass or the alike. A shielding piece may be installed on the observation window for protecting the observation window from any damage or contamination from surrounding environment. For the later choice, the observation window can be made of common transparent materials such as common glass since the observation window has almost no chance to be abraded by the shot particles. In this case, the observation window is easily replaced without much cost. Especially when the circulation conduit is made of tempered or toughened glass, the observation window is not necessary. The observation window may be located in any position of the circulation conduit: at a level of the inlet, a level of the flow sensor or a level of the outlet. In the present application, the observation window is preferred to be positioned near the flow sensor such that the detected signal reflected from the shots can be checked and confirmed with visual inspection for more accurate control of the shot streams.

The media dosage unit may further comprise a shot media storage tank for keeping shot peening media or medium (i.e. shots or shot particles) The storage tank has an ingress for receiving used shots after bombardment and an egression for providing shots to the circulation conduit. In this way, the shot particles can be re-used for the media dosage unit by circulating the shot particles between the storage tank, the circulation conduit and the shot blasting chamber. The storage tank may be either integrated locally with the circulation conduit or located remotely from the circulation conduit. For the former choice, the egress of the storage tank is directly connected to the inlet of circulation conduit; and the exit of the shot blasting chamber is also directly connected to the ingress of the storage tank. This design is suitable for on-site shot peening operation since the media dosage unit is small in size to be easily transported or even portable with a human staff. In contrast, this design has a disadvantage that the volume of the storage tank is so limited that the media dosage unit can only process small work pieces. For the latter choice, the egress and the ingress of the storage tank are extended via an egress pipeline and an ingress pipeline respectively. Although the media dosage unit is not convenient to transport, the volume of the storage tank can be so gigantic that the media dosage unit is applicable for processing shot peening operation to very large objects continuously without replacing the shots during the operation.

The media dosage unit may further comprise a hose connected to the inlet of the shot circulation conduit for receiving the shot peening media into the media dosage unit. A bottom position of the hose matches that of the inlet of the shot circulation conduit such that there is no leakage between the hose and the shot circulation conduit. The hose is preferred to be made of one or more abrasion-resistant and flexible materials such as rubbers or fibre-reinforced rubbers. The hose has several advantages: firstly, the hose reduces sensitivity of microwave signal to the shot circulation conduit such that the microwave signal is diverted. Secondly, the hose also reduces vibration as a damping object when the shot stream pass through the hose.

The media dosage unit may further comprise one or more nozzles connected to the outlet of the shot circulation conduit for discharging the shot peening media to the object such as metal piece inside the shot blasting chamber. Each nozzle has a wide top portion and a narrow bottom portion. The narrow bottom portion is directed to the work piece in the shot blasting chamber. Each nozzle is used for aggregating a stream of shots passing through the nozzle such that the stream of shots can be focused with a controlled size onto a targeted area on the surface of the work piece. For example, the nozzle may have a conical shape where a size of the nozzle gradually reduces along the passing path of the stream of shots. Alternately, the nozzle may be a funnel-like shape that has a sudden alteration in size at a dent portion connecting the wide top portion and the narrow bottom portion. Other types of the nozzle can also be designed according to specific requirements. While passing through the nozzle, the momentum of the shots may be lost due to collisions between the shots and an internal wall of the nozzle, as well as collisions among the shots in the stream. Thus, the conical shape is preferred for less momentum loss due to almost no direct collisions between the shots and the nozzle. In each nozzle, the stream of shots may be controlled at a predetermined speed that is detected and further controlled by the flow sensor. In addition, the nozzle may be shifted and/or rotated during shot peening operation such that different areas of the work piece can be processed without moving the work piece.

The media dosage unit may further comprise a shot media accelerator coupled to the shot media storage tank. The media dosage unit may adopt either one of the two major systems of air blast machine for providing momentum to the shot particles: the pressurized system (i.e. direct pressure-type) or the vacuum-suction system (i.e. suction-type). For the pressurized system, the accelerator can be a compressor or the alike using compressed air to push the shots forward; while for the vacuum-suction system, the accelerator can be a vacuum-suction cup or the alike generating vacuum to pull the shots forward. Mechanical accelerators such as an impeller or a blast wheel can also be installed for providing additional momentum to the shot particles. with the flow of shots.

The media dosage unit optionally further comprises a media flow valve connected to the circulation conduit for regulating a flow rate of shots. Generally speaking, when the valve is partially or completely open, the shots can flow from the storage tank into the circulation conduit; and when the valve is completely closed, the shots cannot flow into the circulation conduit and the media dosage unit is stopped. The media flow valve can be a mechanical valve, electromagnetic valve or other types. The mechanical valve typically has a mechanically controlled plunger that detachably rests on an orifice by default. The orifice is connected to the circulation conduit. When the flow valve is closed, the plunger rests on the orifice and the path from the storage tank to the circulation conduit is blocked. When the plunger is raised by a human operator or a mechanical lever from the orifice, the path is cleared and remained open for the shot streams to flow through the orifice. The electromagnetic valve such as a known flow sensor incorporates an electromagnetically controlled plunger for controlling media flow. With power is applied, an electromagnet raises the plunger to allow the shots to flow through the orifice. When the power is turned off or interrupted for any reason, the plunger returns to its rest position and as a result blocks the shot stream. The plunger is designed to securely hold the shot stream, and thereby virtually eliminating any media leakage. The electromagnetic valve has a major advantage that an automatic closed-loop system is available with a programmable controller such as FC-24 Controller integrated with the known flow sensor. Compared with the mechanical valve, the programmable controller of the magnetic valve has more accurate regulation of the shot stream. For the media dosage unit, the desired flow rate can be exactly repeated with help of the programmable controller and the electromagnetic valve. In addition, the programmable controller can be controlled by a pre-set program automatically without an operator's involvement; and the productivity is significantly enhanced.

The flow valve may be installed either before the flow sensor as upstream, after the flow sensor as downstream or together with the flow sensor. Generally, the flow valve is preferably integrated with the flow sensor for saving internal space and also make the structure of the media dosage unit less complicated for easy maintenance and repair. For example, a paddle as a flow sensor is integrated with 700-24. The shot media passes the plunger and drops onto the paddle, bending the paddle according to the media's flow rate and thereby producing an accurate flow rate signal. Preferably, the flow valve is in electrical communication with the flow sensor. As a result, the controller of the flow valve can function based on the real-time measurement of the flow rate detected by the flow sensor. Without a delay in the electrical communication, a closed feedback control loop is set up between the controller of the flow valve and the flow sensor.

The media flow valve may be configured to open or preferably close a flowing passage of the shot circulation conduit at a default position in the absence of power supply. For example, if the media flow valve is closed at the default position, the media dosage unit does not work without electricity supply. Once the electrical switch is turned on, the shot media is first supplied from the storage tank into the circulation conduit, then flows along the circulation conduit to the work piece; and finally is collected and recirculated back to the storage tank. In contrast, the media dosage unit would operate in an opposite way if the media flow valve is open at the default position in absence of electrical power.

A real-time operation status is presented with a graph in which the flow rate of shots is drawn as X-axis while the signal detected from the flow sensor is used as Y-axis. The flow rate of shots is measured in the unit of kilogram per minute (kg/min). The mentioned graph has to be linear with an upward trend, i.e. the signal of the flow sensor in Y-axis increases linearly with the increasing flow rate of the shots in X-axis. Regarding microwave sensor as the flow sensor, for non-ferrous shots, a linear graph of the media dosage unit is readily available because microwave emitted by the microwave sensor can easily pass through the non-ferrous materials and thus a small amount is reflected back from the non-ferrous shots into the microwave sensor. In contrast, microwave does not easily penetrate through ferrous materials and thus a large amount tends to be reflected from ferrous shots into the microwave sensor.

The microwave flow sensor has two major issues for ferrous shot media. Firstly, since microwave cannot penetrate metallic materials, the reflected signal can only be detected from ferrous shot particles located at a periphery of the ferrous media stream. While ferrous shot particles are almost ignored inside the ferrous media stream where microwave cannot reach. Secondly, the microwave sensor can easily reach a saturation level even for a slow flow speed of ferrous shot media, due to an extremely low attenuation effect for microwave reflection on ferrous materials. The media shot unit is modified with some new features to solve the issues for ferrous shot particles.

To meet the requirement of the flow sensor of the media dosage unit may further comprise a media guider (i.e. guider or medium guider) or media flow distributor for altering or adjusting a flow pattern of the shots. The shots flow in the circulation conduit in basically two distinctive patterns: an aggregated pattern or a scattered pattern. For the aggregated pattern, the shot particles are grouped together into one or more clusters, and each cluster has an external portion that located at the periphery of the cluster and an internal portion that encapsulated inside the external portion. As a result, the shots of the internal portion are difficult to be detected via the flow sensor. For the scattered pattern, the shot particles are separated from each other without direct contact, and thus almost all the shot particles can be detected with the flow sensor. The guider of the media dosage unit can alter a shot stream from the aggregated pattern to the scattered. In addition, the guider can also adjust the scattered pattern slightly. For example, a flow of shots in a scattered pattern has a short distance between two adjacent shots; a guider may be used for adjusting the short distance to a larger distance between the two adjacent shots in the stream. In other words, the shot stream in the scattered pattern becomes more spread after passing through one type of guider. In contrast, a more scattered pattern of a shot stream may be adjusted to a less scattered pattern by another type of guider. But the shot stream is still kept as a scattered pattern. The guider is selected according to the flow sensor and the nature of the shot material of the media dosage unit. For example, when a microwave sensor is adopted, a guider is necessary for providing a scattered pattern for a ferrous shot stream. While for non-ferrous shots, the guider is not compulsory since either an aggregated pattern or a scattered pattern of the non-ferrous stream is applicable to the microwave flow sensor.

In particular, the guider or media guider preferably comprises one or more first spreaders for scattering or deforming the stream of shot media. The first spreader has a plurality of openings or perforations for the shots to pass through. Each of the plurality of openings comprises a frame for defining the opening and one or more holes for shot particles passing through. In this way, the shot particles are spread or scattered by the frame and thus the stream of shot particles is deformed. Meanwhile, the flow of shot particles is slowed by the first spreader due to collisions between the shot particles and the frame of the first spreader. As a result, the signal strength of reflected microwave can be reduced effectively. The holes of the openings can have various shapes, sizes and positions according to specific requirements. For example, the shape of a hole can be square, round, or even irregular. The size of a hole measured at the narrowest point is larger than the diameter of the shot particle. For example, a rectangular hole is measured by a length ranging from 3 to 60 mm and a width ranging from 3 to 10 mm; while a round hole is measured by a diameter ranging from 3 to 40 mm. The position of each hole within the frame of the opening can also be flexibly designed. Specially, the opening may have holes of different types for categorizing the shot particles if a mixed shot media is adopted.

The first spreader may comprise one or more sub-units including sieves, meshes, perforated plates, slits, punctured blocks, through channels, through spindles, distributing plates, pressurised air guns, static or dynamic electromagnetic fields, vibrators or hoppers or the alike. If two or more sub-units of the first spreader are installed in the guider, the sub-units may be aligned linearly, vertically or with any angle. For example, two wire meshes are stacked with the longitudinal axes lined up with each other such that the shot media passing through the second wire mesh on the bottom becomes more uniformly distributed compared with only a first wire mesh on the top. The first spreader has a flexible design of the sub-units. For example, the two or more sub-units of the first spreader may be aligned to the circulation conduit, to each other, or both.

The first spreader or the sub-units of the first spreader can be made of various materials that are suitable to specific requirements. For example, for ferrous shots, the first spreader is preferably made of hard materials such as reinforced steel that is more durable to collisions; while for non-ferrous shots, the first spreader can be made of other metals such as copper or aluminium alloy that is more resistant to chemical erosion.

The guider may be either permanently or detachably installed in the flow sensor of the media dosage unit. For example, the guider may be permanently welded to the flow sensor. However, the flow sensor as a whole has to be replaced when the guider is damaged. Alternatively, the guider may be installed with a clamp such that the guider can be detached from the flow sensor when the clamp is loosened. Alternatively, the guider may be screwed with a nut, pinned with a bar, or ties with a rope to the flow sensor. In this way, a damaged or worn guider can be replaced by a new one. Compared with the permanently installed guider, the cost of replacing a detachable guider is much lower and the replacement operation is also much simpler. The detachable guider also has an advantage that a detachable guider of one type can be replaced by another detachable guider of another type without changing the flow sensor as a whole. In a word, each spreader can be either permanently or detachably installed in the guider; while each sub-unit can be also either permanently or detachably installed in the first spreader. In addition, besides the flow sensor, the guider may be installed at any position along the circulation conduit, either permanently or detachably. One or more additional guiders may also be used for altering or adjusting more significantly the flow pattern of the shots. In summary, the design of the guider has the most flexibility that meets diversified requirements with a low cost and an easy replacement operation.

The flow sensor may further comprise a signal regulator for adjusting signal strength of the flow sensor, guiding microwave (e.g. changing angle) or focusing microwave. In order to easily control the stream of shot media, the strength of the signal falls within the linear region on the graph by which a real-time operation status is monitored. When the reflected signal from the shot particles is too strong, the flow sensor tends to be saturated and thus the operation status falls outside the linear region on the graph. For a combination of a certain shot media and a certain flow sensor, the saturation issue is so serious that the media dosage unit cannot work properly even the flow rate of shot media is still lower than required.

For example, the signal regulator optionally comprises a microwave signal regulator (also known as microwave signal attenuator), when a ferrous shot media and a microwave flow sensor are adopted in the media dosage unit. The signal reflected from the ferrous shots are too strong that the microwave flow sensor is easily saturated below a required flow rate. To overcome the issue, a microwave signal regulator is used for absorbing and/or redirecting a portion of the reflected microwave signal outside the microwave flow sensor. A remaining portion of the reflected signal is detected by the microwave sensor. In this way, the signal strength is reduced and the operation status falls back to the linear region of the graph. Preferably, the microwave signal regulator is an absorbing type since the absorbed portion of the signal would not interface with the remaining portion of reflected signal. In contrast, the redirected portion of the signal might be noise to the remaining portion of the signal. The microwave signal regulator can be made of polymeric materials filled with magnetic particles (known as magnetic absorbers), open celled foam impregnated with a carbon coating (known as foam absorbers), or other materials with a similar property. The magnetic absorber has both high permeability (i.e. magnetic loss properties) and high permittivity (i.e. dielectric loss properties). The combination of the two properties makes the magnetic absorbers very suitable for the microwave signal of high frequency. The foam absorber acts like a free space resistor to incoming electromagnetic energy, and thus is suitable for microwave signal that spans almost a full spectrum.

The signal regulator may comprise one or more layers made of signal attenuating materials (e.g. absorbing or redirecting materials); or signal enhancing materials. Therefore, the signal regulator is adjustable in attenuating or enhancing the reflected signal according to the flow rate and nature of the shot particles. For ferrous shot particles, when the flow is too fast, additional layers of signal absorbing or redirecting materials are attached for reducing more signal strength; while the flow is slow, some layers can be detached from the signal regulator for reducing less signal strength. For non-ferrous shots with a slow flow rate, the signal regulator is not necessary since the reflected signal strength falls readily within the linear region of the graph; while the flow rate is too low, some enhancing layers can be attached for enhancing the signal strength into the liner region of the graph.

The signal regulator is possibly detachable from the flow sensor in order to change effect of influence or regulation. For example, when microwave signal of high frequency is needed for the media dosage unit, an existing signal regulator with foam absorbers is firstly detached from the flow sensor; and then another signal regulator with magnetic absorbers is attached to the flow sensor. In addition, if an existing signal regulator is damaged, it can be replaced by a new signal regulator via an easy operation. The signal regulator of one type can be replaced by another signal regulator of a different type when required. For example, when an optical signal regulator is required for the flow sensor, an existing microwave signal regulator is detached from the flow sensor and the optical signal regulator is attached instead.

The signal regulator further optionally comprises a sleeve attached to one or more parts (e.g. as a wall) of the shot circulation conduit in order to absorb or redirect a portion of the reflected signal if the reflected signal is too strong; or to enhance the reflected signal if the reflected signal is too weak. Similarly, the sleeve may comprise one or more layers signal attenuating materials, e.g. absorbing or redirecting materials; or signal enhancing materials. Therefore, the sleeve is able to adjust in attenuating or enhancing the reflected signal according to the flow rate and nature of the shot particles. For ferrous shot particles, when the flow is too fast, additional layers of signal absorbing or redirecting materials are incorporated for reducing more signal strength; while the flow is too slow, some layers can be detached from the circulation conduit. For non-ferrous shots with a slow flow rate, the sleeve is not necessary since the reflected signal strength falls readily within the linear region of the graph; while the flow rate is too low, some enhancing layers can be attached for increasing the signal strength into the liner region of the graph.

The media dosage unit further preferably comprises a hopper connected to the media flow valve, the flow sensor, or both for feeding the shot peening particles (i.e. shots). The hopper has a wide top opening, a tapering body downward and a narrow bottom opening. The shot particles from the storage tank enter into the hopper from the top opening, go through the body and finally is discharged out of the hopper from the bottom opening. According to a predetermined manner, the shots in the hopper can be discharged either smoothly, continuously or in any predetermined manner. The hopper has a major advantage of easily feeding the shot particles into the media dosage unit due to the wide top opening. In addition, the shot particles might be scattered apart from each other because of possible collisions between the shot particles and an internal wall of the hopper when the shot particles flow through the hopper. As a result, the hopper provides an additional process for altering or adjusting the pattern of shot stream.

The media dosage unit can further comprise a protective casing for enclosing the flow sensor, the media flow valve, the circulation conduit, the hopper or any other components to form an integral unit. The protective casing provides a protective enclosure for all the internal components from outside contamination or even possible hazards. The protective casing is rated according to IP Marking standard (International Protection Marking or Ingress Protection Marking) that classifies the degree of protection provided against intrusion, dust, accidental contact, and water. Preferably, the interface between the ingress of the storage tank and the inlet of the circulation conduit is protected at IP68 standard. IP68 standard is deemed good enough to withstand dust, dirt and sand, and is also resistant to submersion up to a maximum depth of 1.5 meters underwater for up to thirty minutes. Otherwise, water or even moisture can damage the media dosage unit seriously since almost all the metal components including the ferrous shots and metal work pieces are not robustly resistant to chemical erosion.

The media flow valve of the media dosage unit can further comprise a holder having a through hole for aligning with the shot circulation conduit in order to transfer shot peening particles via the through hole; and a shutter supported by and lined up with the holder. The holder further comprises a base plate with a first through hole, and a bottom plate with a second through hole placed on the base plate. Particular, the through hole comprises the first through hole of the base plate and the second through hole of the bottom plate. While the shutter further comprises a valve pulley and a top plate installed on the valve pulley. In the holder, the base plate provides mechanical support for the media flow valve as a whole; while the bottom plate provides support for the shutter including the valve control pulley and the top plate. The top plate can cover the through hole including the first and second through holes either partially or completely.

An embodiment of the shutter is movable with respect to the holder for adjusting an opening size of the through hole in order to regulate flow rate of the shot peening particles. When completely covered, the media flow valve is fully closed; and the media dosage unit stops working since the media stream cannot pass through the top plate and the media flow valve. When partially covered or not covered, the media flow valve is opened; and the media dosage unit starts to operate. The flowing volume of the media can be thus adjusted by controlling the coverage of the top plate on the through holes. The less the coverage, the higher the flow rate of the media. All the components are made of abrasion-resistant materials to the media shot particles. In particular, the top plate is made of materials that are able to resist repeated collisions with the media shot particles.

The first through hole of the base plate optionally extends from the bottom surface to the top surface of the base plate. The first through hole can be located at any position of the base plate. Preferably, the first through hole is at the centre of the base plate. The first through hole may be of any shape, such as a rectangular or round shape. The second through hole of the bottom plate extends from the bottom surface to the top surface of the bottom plate. The second through hole can be located at any position of the bottom plate. Preferably, the second through hole is at the centre of the base plate. The second through hole may be of any shape, such as a rectangular shape with a length ranging from 25 to 32 mm and a width ranging from 25 to 60 mm Alternatively, the second through hole may have a round shape with a diameter ranging from 25 to 60 mm. The first hole and the second hole at least partially overlap for forming a path of shot peening particles (i.e. shots). Advantageously, the first through hole and the second through hole have a same size and shape. More advantageously, the first through hole and the second through completely overlap when the bottom plate is placed on the base plate.

The shutter can comprise the top plate and the valve pulley attached to the top plate for moving the top plate with respect to the holder. The top plate of the shutter in the media flow valve is movable relatively to the holder including the base plate and the bottom plate by the valve pulley. The valve pulley is controlled either manually by hand or automatically by a switch. The switch can be further connected to a logic gate or a Programmable Logic Device (PLD). A logic gate has a fixed function such as AND, OR, XOR, NOT, NAND, NOR, XNOR or any combination of these. In contrast, PLD includes Programmable Logic Array (PLA), Programmable Array Logic (PAL), Generic Array Logic (GAL), Complex Programmable Logic Device (CPLD), Field-Programmable Gate Array (FPGA) or other variants. PLD is preferred when a working program of the media flow valve has to be changed or adjusted. For example, when the media dosage unit is disconnected from a power supply, the top plate is set at a fault position that the two through holes are completed covered. After power is supplied to the media dosage unit, the switch is turned on such that the top plate is pulled out by the valve pulley according to the program of PLD; and thus the two through holes are partially or completely opened for the flow of media shot to pass through the media dosage unit. The flow rate of media shot can be controlled by adjusting the position of the top plate by the valve pulley. The adjustment can be programmed and stored in the PLD for automatically controlling the operation of the media flow valve and further the media dosage unit.

The shutter or the media dosage valve may comprise a top plate for providing non-levelled surface (i.e. not horizontal surface or tilted surface) especially when in shot peening usage or when installed in a shot peening machine for preventing accumulation or clogging of shot peening particles at the shutter or the top plate under gravity. A gap may not be avoided between the top plate, the valve pulley and the bottom plate. Some shot particles may be caught and the stored inside the gap while the flow of media shot pass through the media flow valve. The flow of media shot is likely to be interfered if the residual particles fall out of the gap and remerge with the flow from time to time. The interference would make the flow of media shot not stable which in turn leads to difficulties in monitoring and controlling the flow. The issue is more serious when the shot particles are finer or the flow rate is higher. To overcome the issue, the bottom plate, the valve pulley and the top plate are tilted over the base plate for allowing the shots to roll back to the second hole of the bottom plate. The tilted angle is preferably ranges from a degree of 20° to 80°. In this way, the media flow valve would not be stuck by the shots even if the particle size is fine and/or the flow rate is high. In addition, the flow of media shot can be more stable against time during operation without residual particles in the media shot valve.

The holder of the media flow valve can further comprise a spreader having openings, holes or perforations of at least one predetermined size (e.g. diameter). This spreader is also known as a second spreader, such as a mesh or a perforated plate) The second spreader is optionally placed between the base plate and the bottom plate for scattering shot peening particles (i.e. shots) and thus deforming an incoming shot flow. The second spreader is similar to the first spreader in terms of structure, materials and other aspects. The second spreader may be installed in the media flow valve, either permanently or detachably. Preferably, the spreader of the holder (i.e. second spreader) is removable, detachable, or replaceable from the media flow valve such that the second spreader can be removable or replaceable when required. The second spreader is able to work independently from the first spreader. To achieve a better altering effect, the second spreader can be used as an additional spreader in the media flow valve, in addition to the first spreader installed in the guider of the flow sensor. Otherwise, the second spreader may work solely. In this way, the first spreader and the second spreader can work alternatively when either of the two spreaders does not function well or is not easy to be installed. When having both of the first and second detachable spreaders, the media dosage unit has an advantage of working in a continuous and non-stop manner even if one of the spreaders fails to work properly. The malfunctioned spreader can be replaced or repaired while the other spreader still functions properly in the media dosage unit.

The second spreader may comprise one or more sub-units including sieves, meshes, perforated plates, slits, punctured blocks, through channels, through spindles, distributing plates, pressurised air guns, static or dynamic electromagnetic fields, vibrators or hoppers or the alike. If two or more sub-units of the second spreader are installed in the media flow valve, the sub-units may be aligned linearly, vertically or with any angle. For example, two wire meshes are stacked with the longitudinal axes lined up with each other such that the shot media passing through the two wire meshes becomes more uniformly distributed over a first wire mesh on the top followed by a second wire mesh at the bottom. The design of the second spreader is flexible that may have various sizes, shapes and thicknesses. However, the second spreader cannot be too thick for preventing the media flow through the media flow valve from leakage. Preferably, the thickness of the second spreader ranges from 2 to 10 mm.

The media dosage unit may have a third independent spreader installed before the flow sensor for further scattering shot peening particles (i.e. shots) and thus deforming an incoming shot flow. Similar to the first spreader in the flow sensor or the second spreader in the media flow valve, the third independent spreader also has openings, holes or perforations of at least one predetermined size (e.g. diameter).

The media dosage unit for shot peening may further comprise other applicable features. For example, a dust remover or collector may be installed to the media dosage unit for removing dust or other foreign contaminants that would interference. An extractor or abrasive separator may be used for reducing or even eliminating abrasion during transferring the shot particles. An abrasive reclaim conveyor may also be installed to help with recycling the shot particles.

The media dosage unit for shot peening may further comprise an indicator connected to the flow sensor such as a display screen, a warning light, an audio alarm, a loud speaker, a touchscreen, or a combination of any of these. The indicator can notify a human operator when the flow rate is deviated from the pre-determined value. A communication unit may be connected to the flow sensor for transferring operation information to the indicator remotely. The communication unit uses Information and Communications Technology (ICT) for providing automatic data transmission of the media dosage unit so that the media dosage unit be locally or remotely monitored or operated. A local or remote computing device may be linked with the media dosage unit for data analytics or diagnosis. A safety mechanism may be equipped for suspending the operation of the media dosage unit when detecting system fault. The safety mechanism can detect gas leakage, media leakage, hazardous electric current discharge or any other safety issues so that the media dosage unit cannot start shot peening process without resolving these safety issues.

The media dosage unit optionally comprises a flow separator (e.g. media filter) installed inside an internal shot circulation conduit (also known as shot circulation conduit or conduit) for altering distribution pattern of the solid particles. For example, the flow separator is able to disperse streams of shots (e.g. solid particles) at one or more downstream shot circulation conduits, especially near the flow sensor. Particularly, the flow separator is able to scatter, spread or even partially block fast moving shots (e.g. solid particles) so that the fast moving shots are more uniformly or evenly distributed over an entire cross section area of the internal and external shot circulation conduit. One example of the flow separator includes a blower or air compressor that supplies pressurised air streams to the shots so that the shots are dispersed or distributed evenly. Another example of the flow separator has symmetric structure for scattering the solid particles more uniformly.

The flow separator sometimes has a unitary component by moulding or discrete components by assembling. For example, the flow separator comprises a flow separator top, a flow separator mid and a flow separator bottom. The flow separator top and the flow separator bottom are installed on and inside the flow separator mid respectively. More specifically, the flow separator mid may further comprises a through hole and an internal structure extending into the through hole. The internal structure of the flow separator mid further comprises two or more protruding parts on one hand for fixing the flow separator bottom and on the other hand for scattering the solid particles uniformly. The flow separator bottom further comprises two or more openings (e.g. such as elongated opening or slot) on one or more side surfaces for scattering the solid particles uniformly. The openings can be evenly distributed.

According to another aspect of the present application, a method of using the media dosage unit for shot peening is also disclosed. The method of using comprises firstly providing one or more shot peening medium; secondly accelerating and decelerating the one or more peening medium to a predetermined speed and/or a flow rate; thirdly measuring the flow rate of the one or more shot peening medium; and finally directing the one or more shot peening medium to an object for treating surface of the object. Some steps of the method may be combined, separated or changed in sequence.

The shot peening media or medium is optionally provided from a local or remote storage tank. The shot peening media can be ferrous, non-ferrous or a combination of both ferrous and non-ferrous shot peening media. The shot peening media is selected according to the nature of the object or work piece and working requirements. When a mixed shot peening media is adopted, different particles can be initially mixed in the storage tank. Alternatively, two or more storage tanks are connected with the hopper of the media dosage unit such that each type of particles are provided by a respective storage tank; and then the particles of multiple types are mixed inside the hopper.

The shot peening media can be accelerated in the circulation conduit before passing by the flow sensor. According to the type of air blast machine, the media dosage unit can be either direct pressure-type (i.e. pressurized system) or suction-type (i.e. vacuum-suction system). In the former system, the media shots are pushed by pressurized air to reach a predetermined speed; while in the later system, the media shots are pulled by vacuum created by a vacuum-suction cup. In a reverse process, the shot peening media can be also decelerated in the circulation conduit by either direct pressure-type (i.e. pressurized system) or suction-type (i.e. vacuum-suction system) in an opposite direction to a predetermined a flow rate. Alternatively, the flow rate can also be lowered down by partially closing the media flow valve where a portion of the momentum of the shot particles is lost due to collisions between the particles and the media flow valve.

The flow rate of the shot peening medium may be measured by the flow sensor. The flow sensor is selected according to the type of the media adopted, ferrous or non-ferrous. If ferrous media is necessary, a microwave flow sensor is preferred. An outgoing microwave signal is sent out from a transmitter or a transceiver of the microwave flow sensor; and then encounters with the passing media in the circulation conduit. A reflected microwave signal is generated since a portion of the outgoing microwave is reflected back as an incoming microwave signal that received by a receiver or the transceiver of the flow sensor. The incoming microwave signal can be made weaker by an attenuator or stronger by an amplifier such that the incoming microwave signal fall within the linear region of the measuring graph.

Furthermore, the step of measuring the flow rate of the shot peening medium optionally comprises installing, repairing, patching, examining, testing or replacing the media flow sensor such as the microwave flow sensor. Preferably, the media flow sensor can be easily decoupled from the circulation conduit via a detachable connector. If an additional flow sensor is installed for as a backup for redundancy, the media dosage unit can work in a continuous manner. The backup flow sensor is activated to replace the damaged flow sensor; and meanwhile the damaged flow sensor is decoupled from the circulation conduit for examining, patching or repairing. During the decoupling process, the media dosage unit is not stopped and thus the productivity is greatly enhanced for shot peening.

The object or work piece is sometimes placed on a bracket in a blasting chamber. the bracket is suitable to the shape and size of the object. A nozzle is often installed to the end of the circulation conduit. The nozzle is rotated for directing the shot peening medium to the object for treating a surface of the object. In particular, if the medium comprises two or more types of shot particles for the same object separately, multiple nozzles can be installed with each type of medium directed by a respective nozzle. For example, a first nozzle is rotated near the object, and a first media of large shot particles passes through the first nozzle is directed to the object for a first shot peening process; and then the first nozzle is rotated away from the object after the first process is completed. Next, a second nozzle is rotated near the object, a second media of small shot particles passes through the second nozzle is directed to the object for a second shot peening process; and then the second nozzle is rotated away from the object after the second process is completed. A third or more shot peening processes can be conducted without stopping the media dosage unit and changing the nozzle. In this way, the media dosage unit can work in a continuous manner for greatly enhancing productivity of shot peening.

The method of using the media dosage unit for shot peening may further comprise a step of adjusting the pre-determined speed of the at least one shot peening medium automatically. The step of adjusting the predetermined speed of the shot peening medium automatically is conducted by forming a closed-loop control system. The closed-loop control system (also known as a feedback control system) generally adopts a portion of an output signal as feedback to be fed back to an input terminal for reducing errors and improving stability of the control system. For example, a pre-determined flow rate is set in a programmable controller connected to the media flow valve. If a detected flow rate is higher than the pre-determined value, the programmable controller would send a weakening signal to the media flow valve for closing the valve narrower accordingly; and the flow rate is thus decreased. In contrast, if a detected flow rate is lower than the pre-determined value, the programmable controller would send a strengthening signal to the media flow valve for opening the valve wider accordingly; and the flow rate is thus increased.

The step of measuring flow rate of the one or more shot peening medium can further comprise utilising (e.g. transmitting, receiving) microwave for gauging (e.g. measuring or checking) the flow rate when a microwave flow sensor is adopted as the flow sensor in the media dosage unit. The microwave flow sensor is suitable for detecting moving shot particles based on Doppler effect. For example, a flow sensor or microwave flow sensor can be installed on a shot circulation conduit in order to measure the predetermined peed or flow rate.

The step of measuring flow rate of the one or more shot peening medium may further comprise transmitting data of the predetermined speed. Operation information including the flow rate of the shot media can be displayed or wireless/wired transmitted via IoT (Internet of Things) for remote transmission, data analytics or diagnosis.

When the microwave flow sensor is adopted in the media dosage unit, the method of using the media dosage unit for shot peening can further comprise a step of producing (e.g. emitting, generating, or transmitting) microwave towards the shot media in order to check flow rate of the shot media.

The method of using the media dosage unit for shot peening optionally further comprises a step of regulating the flow rate by operating a media flow valve automatically. The step of manipulating or regulating (e.g. attenuating, augmenting, focusing) the microwave aims for measuring flow rate of the one or more shot peening medium. Particularly, the step of manipulating (e.g. attenuating, augmenting, focusing, filtering) microwave comprises installing (e.g. attaching, moving, shifting) a microwave reflector (e.g. metal sleeve) or a microwave attenuator (e.g. plastic sleeve) for augmenting or attenuating the reflected microwave signal respectively.

The method of using the media dosage unit for shot peening may further comprise a step of tilting a top plate of the media flow valve for preventing accumulation or clogging the at least one shot peening medium at the media flow valve automatically, such as by installation of the media dosage unit or media dosage valve. In this way, the top plate provides non-levelled surface for preventing accumulation or clogging of shot peening particles at the shutter or the top plate under gravity.

The method of using the media dosage unit for shot peening preferably further comprises a step of guiding (e.g. dispersing, scattering, concentrating, focusing, uniformly distributing, combing, raking) the flow pattern of the one or more shot peening medium to facilitate measurement of flow rate.

The step of providing one or more shot peening medium sometimes comprises a step of changing the one or more shot peening medium. For example, a non-ferrous short peening medium is replaced by a ferrous shot peening medium, or vies verse. The step of changing the one or more shot peening medium optionally comprises adjusting operation parameters of the media dosage unit or the flow sensor. For example, the flow rate may be lowered if the media is changed from non-ferrous shots to ferrous shots since the ferrous media has a harder property.

The step of providing one or more shot peening medium further usually comprises a step of recirculating the one or more shot peening medium via a shot peening machine. The used shot particles after shot peening are collected in the blasting chamber and then transferred to the storage tank. In this way, the shot media can be continuously provided for a long operation.

The method of using the media dosage unit for shot peening may further comprise a step of suspending and sounding alarm operation (e.g. stopping media/medium flow) of a shot peening media dosage unit when detecting irregular flow rate. The operator of the media dosage unit is notified with the irregular flow rate is via one or more indicators. Only after the flow rate is adjusted to within a normal range can the shot peening process be resumed.

According to another aspect of the present application, a method of making or assembling the media dosage unit for shot peening is also disclosed. The making or assembling method comprises providing a solid flow sensor or flow sensor for measuring flow rate of solid particles, also known as shot streams or solid particles; and then coupling the flow sensor to a shot circulation conduit of a shot peening machine with a connector (e.g. detachable connector). For example, the step of coupling the microwave flow sensor comprises connecting a microwave flow sensor to the shot circulation conduit.

The method of making or assembling the media dosage unit for shot peening can further comprise a step of guiding, altering or adjusting flow pattern of the solid particles. In particular, an aggregated pattern of ferrous shot media is altered to a scattered pattern by scattering the ferrous shot particles via a first spreader, a second spreader, or both. Therefore, the step of guiding, altering or adjusting flow pattern of the solid particles optionally further comprises a procedure of scattering, deforming or scattering the solid shot media (i.e. medium) with one or more first spreaders (e.g. sieve).

When the microwave flow sensor is adopted in the media dosage unit, the method of making or assembling the media dosage unit for shot peening may further comprise a step of adjusting the microwave signal strength of the flow sensor with a signal regulator. The reflected microwave signal can be either attenuated or amplified.

The method of making or assembling the media dosage unit for shot peening optionally further comprise a step of attaching a sleeve to a part of the shot circulation conduit such as an internal wall of the circulation conduit in order to absorb, reflecting or enhancing microwave signals.

Embodiments of the method of making or assembling the media dosage unit for shot peening further comprise a step of inspecting the media dosage unit visually by a monitoring system such as an observation window.

An example of the method of making or assembling the media dosage unit for shot peening preferably further comprises a step of installing a media flow valve onto the shot circulation conduit for regulating the flow rate. The media flow valve can be installed either on the main branch or one of the side branches. In addition, the media flow valve can also be installed either vertically or with an angle to the shot circulation conduit.

The method of making or assembling the media dosage unit for shot peening further preferably comprises a step of tilting or inclining a top plate of the media flow valve for preventing accumulation of the solid particles at the top plate. In this way, the top plate provides non-levelled surface for preventing accumulation or clogging of shot peening particles at the shutter or the top plate under gravity.

The method of making or assembling the media dosage unit for shot peening occasionally comprises a step of replacing at least one component (e.g. a spreader) of the media dosage unit. For example, the spreader can be either the first spreader of the flow sensor or the second spreader of the media flow valve. In this way, the media dosage unit can work in a continuous manner and thus enhance productivity.

According to another aspect of the present application, a method of making or assembling a media flow valve is also disclosed. The making or assembling method comprises firstly providing a base plate with a first through hole; secondly installing a bottom plate with a second through hole over the base plate; thirdly installing a valve pulley on the bottom plate; and finally installing a top plate on the valve pulley. Some of these steps can be combined, separated or changed in sequence.

The method of making or assembling the media flow valve can further comprise a step of installing a second spreader between the base plate and the bottom plate for deforming a flow of shot particles.

The method of making or assembling the media flow valve may additionally comprise a step of replacing a first spreader of a media guider or a second spreader of a media flow valve. For a same purpose of scattering shot media, the first spreader and the second spreader can be used alternatively; and thus the media dosage unit equipped with both the media guider and the media flow valve can be operated in a continuous manner for enhancing productivity even if either the first spreader or the second spreader fails to work properly.

According to a further aspect, the present application provides a control valve for regulating or controlling a media dosage unit of shot peening. The control valve basically comprises, a base plate with a first hole, a bottom plate with a second hole placed on the base plate, a valve pulley installed on the bottom plate, and a top plate placed on the valve pulley and over the bottom plate. The control valve is also applicable to ferrous shots by including a mesh between the base plate and the bottom plate for deforming a flow of ferrous shots (e.g. changing distribution or flow pattern).

According to yet another aspect, the present application provides a media dosage unit further comprises a microwave measurement unit such as microwave sensor for measuring a flow rate of the shots, in addition to the control valve for regulating the flow of shots. The microwave measurement unit is typically connected to a power supply, a control output, an alarm output and optionally an analogue output.

The accompanying figures (Figs.) illustrate embodiments and serve to explain principles of the disclosed embodiments. It is to be understood, however, that these figures are presented for purposes of illustration only, and not for defining limits of relevant inventions.

FIG. 3 illustrates specification for casting steel shots;

FIG. 4 illustrates specification for conditioned carbon steel cut wire shots;

FIG. 5 illustrates specification for conditioned stainless steel cut wire shots;

FIG. 6 illustrates specification for hardened steel peening balls;

FIG. 7 illustrates specification for glass bead shots;

FIG. 8 illustrates specification for ceramic bead shots; and

Exemplary, non-limiting embodiments of the present application will now be described with references to the above-mentioned figures.

Figure 1:
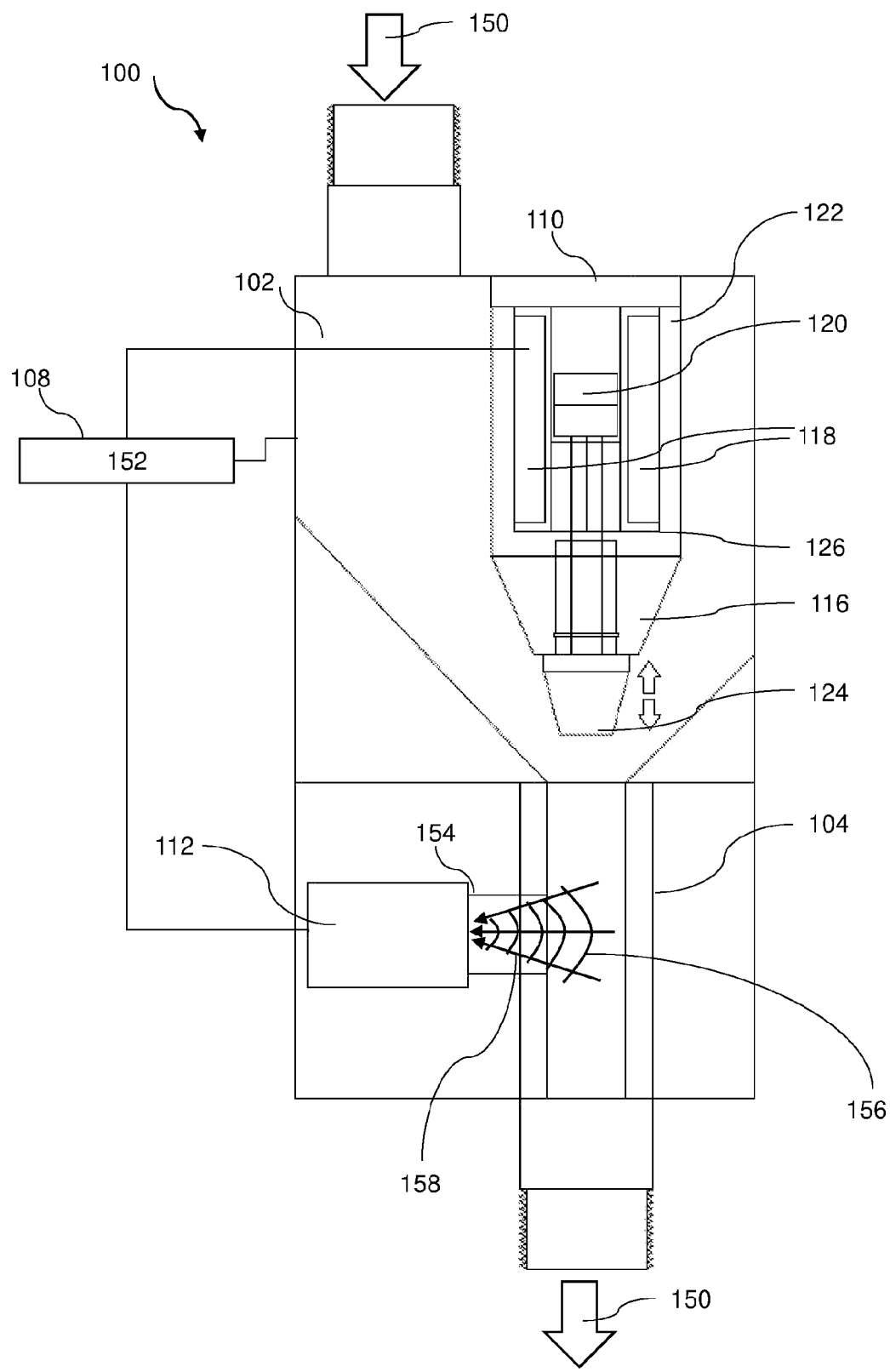
FIG. 1 illustrates a first media dosage unit.

FIGS. 1 to 8 illustrate a first embodiment of the application. Particularly, FIG. 1 illustrates a cross-sectional view of a first media dosage unit (100). The first media dosage unit (100) comprises a hopper (102), a hollow cylindrical body (104), a hollow conduit (106), and a computer (108). The hollow cylindrical body (104) further comprises a core assembly (110). The hollow conduit (106) further comprises a microwave transceiver unit (112).

With reference to FIG. 1, going from a top to a bottom direction, the hopper (102) is a circular funnel attached to a top end of the hollow cylindrical body (104). The hopper (102) has an inner hopper diameter of about forty millimetres (40 mm) and an outer hopper diameter of forty-four millimetres (44 mm). The hollow cylindrical body (104) has a length of one hundred millimetres (100 mm) with an inner body diameter of sixteen millimetres (16 mm) and an outer body diameter of twenty millimetres (20 mm). The hollow cylindrical body (104) is an erecting, straight hollow cylindrical body with an aperture (113) along its curved surface. An interior of the hollow cylindrical body (104) is a passage which allows shot media (114), which are different types of shot particles, ferrous and non-ferrous to be transported from the top end to the bottom end or travelled from the top end to the bottom end thereof.

The core assembly (110) is located at an inner hollow region of the hopper (102). The core assembly (110) comprises a conical member (116), one or more electromagnets (118) wound in metal wire, a permanent magnet (120) and a housing (122). An apex (124) of the conical member (116) is pointing towards the hollow cylindrical body (104). The permanent magnet (120) is adhered at the middle of a base (126) of the conical member (116). The two electromagnets (118) are adjacent to the permanent magnet (120). The housing (122) encompasses the permanent magnet (120) and the two electromagnets (118) forms a contiguous outer surface with the conical member (116). The housing (122) is shaped like a cylindrical cap being inverted and covers the permanent magnet (120) and the two electromagnets (118).

The permanent magnet (120) is a rectangular block. The two electromagnets (118) as shown in FIG. 1 are coiled with metal wires are positioned adjacent to the permanent magnet (120). Alternatively, more than two electromagnets (118) can be used, for example, four electromagnets can be positioned in a north-south-east-west (NSEW) configuration surrounding the permanent magnet (120). The four electromagnets (118) and the one permanent magnet (120) above the conical member (116) are housed in a non-magnetic material housing (122) which encompasses the magnets (118 and 120). The conical member (116) together with the magnets (electromagnet 118 and permanent magnet 120) form a core assembly (110). The core assembly (110) is in a suspended position, not touching a wall of the hollow cylindrical body (104) which allows the shot media (114) to flow through the passage. The core assembly (110) is supported by three struts (128) (not shown) that straddles between an inner periphery wall of the hollow cylindrical body (104) and the housing (122) of the core assembly (110). The three struts (128) are spaced equally with a first strut (130) at a first angle 0°, a second strut (132) at a second angle at 120° and a third strut (134) at a third angle at 240° as viewed from the top end of the hollow cylindrical body (104). Yet another alternative is to use a cylindrical shaped permanent magnet (120) instead of a rectangular permanent magnet (120).

The aperture (113) is located at a middle of the hollow cylindrical body (104). The hollow conduit (106) is joined to the aperture (113) of the hollow cylindrical body (104) orthogonally. A length of the hollow conduit (106) is approximately thirty millimetres (30 mm) has an outer diameter of twenty millimetres (20 mm) and an inner diameter of 16 mm. A first end of the hollow conduit (106) is joined or notched to the aperture (113) of the hollow cylindrical body (104) orthogonally forming a joint (136). A second end or the opposite end has a lid (138) with a round opening (140) at a centre.

The lid (138) is securely bonded to the second end. The round opening (140) has an inner diameter of seventeen millimetres (17 mm). An inner periphery of the round opening screw is threaded. The first media dosage unit (100) is made of metal specifically SUS304 18/8 stainless steel which contains eighteen percent (18%) chromium and eight percent (8%) nickel.

The microwave transceiver unit (112) is secured at the second end of the hollow conduit (106). The microwave transceiver unit (112) comprises a microwave generator (142), a microwave sensor (144). The detected reflected microwave signal is then sent to the computer (108). The microwave sensor (144) further comprises a reflection amplifier (146). The microwave sensor (144) is capable to withstand up to five degrees Celsius of temperature fluctuations from its normal operating temperature. An increased heat is a result of the collision of the shot media (114) and collision against the inner periphery wall of the hollow cylindrical body (104) as the shot media (114) travels along the hollow cylindrical body (104).

Microwave is an electromagnetic (EM) radiation with wavelengths ranging from one meter to one millimetre with frequencies between 300 MHz (100 cm) and 300 GHz (0.1 cm). The microwave transceiver operates in the K band with frequency ranges from 18 to 26.5 GHz.

A tolerable operating temperature of the microwave transceiver (112) ranges from −20° C. to +80° C. An allowable pressure of maximum 0.5 MPa (Mega Pascal). Just to illustrate and compare the relative pressure acceptable by the microwave transceiver (112), the atmospheric pressure (atm) is 0.101 MPa. The microwave transceiver (112) has an Ingress Protection rating of IP65 which relates to solid particle protection and is dust tight. A power supply from the utility (240$V_{ac}$ 50 Hz) is fed to the microwave transceiver unit (112).

The first media dosage unit (100) in its idle state (without electricity flowing through the wound wires), the shot media (114) is not allowed to flow through the passage freely as the magnetic field of the permanent magnet (120) is present. To allow the shot media (114) to flow through the passage freely, electricity is passed through the metal wires wound around the one or more electromagnets (118) which cancels off the magnetic field exerted by the permanent magnet (120). The four wires that are wound around the four electromagnets (118) are connected to a power source (148) outside the first media dosage unit (100) specifically from a top side of the housing (122) (not shown). The magnetic fields of the electromagnets (118) are controlled by the electric current flowing through the wires and is controlled by the computer (108). The electric current for each individual electromagnet (118) can be controlled singularly, in pairs, in threes or altogether.

Alternatively, the permanent magnet (120) can be a cylindrical magnet. Also the four electromagnets (118) can be replaced by a one round electromagnet wound by the metal wire.

Figure 2:
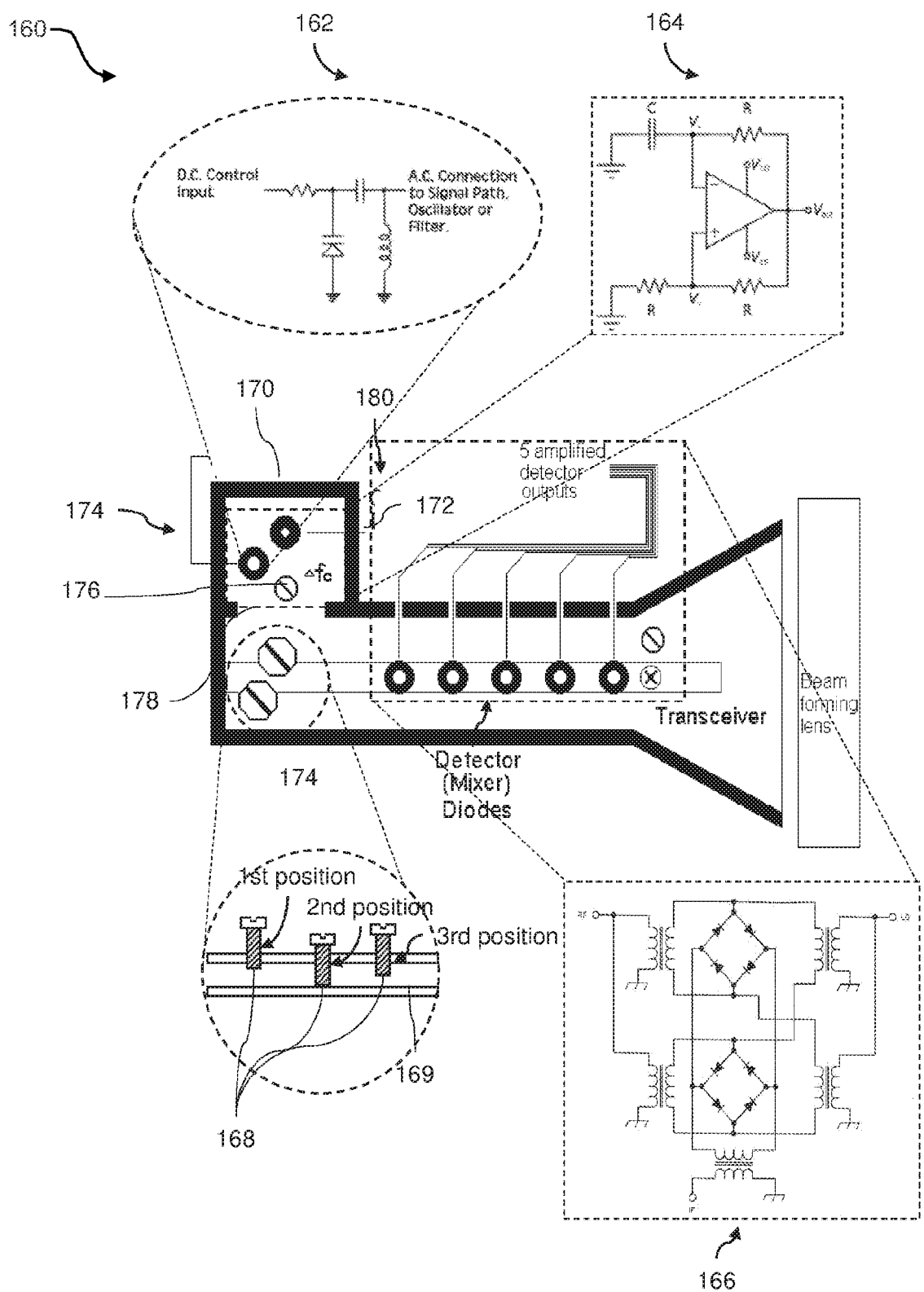
FIG. 2 illustrates a schematic diagram of a microwave transceiver.

FIG. 2 illustrates a schematic diagram of a microwave transceiver (160) comprising a modulator (162), a local oscillator (164), a mixer (166) and a plurality of tuning screws (168). The modulator (162) is shown at the upper left corner. The local oscillator (LO) (164) is shown at the upper right corner. The mixer (166) is shown at the lower right corner and the tuning screws (168) is shown at the lower left corner. The elements shown in the microwave transceiver (160) provides an overview of the main blocks and is now to be construed as limiting to a specific position.

The varicap diode (170) in a circuit is connected to a tuned circuit, usually in parallel with existing capacitance or inductance. A DC voltage must be applied reverse bias across the varicap (170) to alter its capacitance, this must be blocked from entering the tuned circuit. This is accomplished by placing a DC blocking capacitor with a capacitance about 100 times greater than the maximum capacitance of the varicap diode (170) in series with it and applying the DC from a high impedance source to the node between the varicap cathode and the blocking capacitor as shown in the upper left corner in a broken-lined ellipse.

The Gunn diode (172) is also known as a transferred electron device (TED), is a form of diode, a two-terminal passive semiconductor electronic component, with negative resistance, used in high-frequency electronics. Gunn oscillators are used as local oscillator (LO) (164) as shown at the top right broken-lined box in the media dosage unit. The Gunn diode (172) is mounted in a cavity (174) tuned to resonate at twice the fundamental frequency of the diode. The cavity length is changed by a micrometer adjustment (cavity tuning screw) (176). The LO is connected via a 10 dB attenuator (not shown) prior connecting to the mixer (166). When the LO is used at a receiver, matching is achieved since only a small proportion of the power generated (5 mW to 20 mW) is required to operate the mixer (166) (0.5 to 1 mW), the rest being dissipated in a matched load. The LO may feed the mixer either through a 10 to 15 dB attenuator or via a directional coupler (not shown) into a dummy load.

The size of an iris (178) coupling the LO to the cavity (174) is such that the output of the LO is reduced by a maximum of about a third (i.e. about 2 dB) as they are tuned together.

The plurality of mixer diode is designed to convert radio frequency (RF) which includes microwave to an intermediate frequency as efficiently as possible. The reason is that selective amplifiers at the RF frequency are expensive so that signal is converted to a lower frequency where high gain and good selectivity can be achieved. The frequency conversion is obtained by operating a mixer diode with fast response and high cut-off frequency as a switch, turning it on and off at a rate determined by the local oscillator (LO) (164). The output frequency is then the difference between the LO frequency and the RF frequency.

The diode double-balanced mixer contains two or more unbalanced-to-balanced transformers and a diode ring consisting of 4×n diodes, where n is the number of diodes in each leg of the ring. Each leg commonly consists of up to four diodes. Input and output ports-commonly named local oscillator (LO) (164), radio frequency (RF) or signal, and intermediate frequency (IF) connecting the DBM to its associated circuitry.

Five transmission-line transformers and two Schottky-quad rings form a double double-balanced mixer (DDBM) as shown at the lower right corner in a broken-lined box. Such designs can provide lower distortion, better signal-handling capability and higher interport isolation than single-ring designs.

One extension of the single-diode-ring DBM is a double double-balanced mixer (DDBM) with high dynamic range and larger signal-handling capability than a single-ring design. The DDBM uses transmission-line transformers and two diode rings. This type of mixer has a higher 1-dB compression point (usually 3 to 4 dB lower than the LO drive) than a DBM. Low distortion is a typical characteristic of DDBMs. Depending on the ferrite core material used, frequencies as low as a few hundred Hertz and as high as a few GigaHertz is covered.

A plurality of tuning screw (168) (shown in the broken-lined circle at the lower left corner) provides a reactive (contrary to passive) element. When the screw is advanced slightly into a waveguider (169) or not at all also known as a first position, it becomes capacitive. When the screw is advanced fully into the waveguider (169) known as a second position, it becomes 169 inductive. When the screw is adjusted in between the two mentioned positions also known as a third position, it becomes a resonant LC (inductor-capacitor) circuit.

A mixture of shot media (114) together with a fluid (182) travels at a high speed from a top end of the hollow cylindrical body (104) to a bottom end thereof. The fluid (182) is a pressurised air from a compressor (not shown). The mixture of media (114) is fed into the hollow cylindrical body (104) by a one or more hopper (102) which is located at the top end of the hollow cylindrical body (104). The media (114) can include a ferrous and a non-ferrous media. Alternatively, the air can also be drawn from the hollow cylindrical body (104) from the bottom end which has a vacuum.

FIGS. 3, 4, 5 and 6 illustrate four tables showing the shape requirements for the different media type and sizes relating to ferrous media. FIG. 3 shows the specifications for cast steel shots. FIG. 4 shows the specifications for conditioned carbon steel cut wire shot. FIG. 5 shows the specifications for conditioned stainless steel cut wire shot. FIG. 6 shows the specifications for hardened steel peening balls.

The media types and sizes of the ferrous media are according to the following specifications which satisfies the requirements of SAE (Society of Automotive Engineers) AMS 2430, AMS 2431 and AMS 2432:

Cast steel shots (ASR/ASH70-ASR/ASH930) where ASR is regular hardness according to AMS2431/1 and ASH is high hardness according to AMS2431/2, the numerals described the shot size as shown in FIG. 3;

Conditioned cut wire shot (AWCR/AWS2-AWCR/AWS116) where AWCR relates to a conditioned carbon steel cut wire shot according to AMS2431/3D as shown in FIG. 4 and AWS relates to a conditioned stainless steel cut wire shot according to AMS2431/4C as shown in FIG. 5; and Hardened steel peening ball according to AMS2431/5 (APB7/16-APB3/32) as shown in FIG. 6.

FIG. 7 and FIG. 8 illustrate two tables showing the shape requirements for the different media type and sizes relating to non-ferrous media. FIG. 7 shows the specifications for glass bead and FIG. 8 shows the specifications for ceramic bead.

The media types and sizes of the non-ferrous media are according to the following specifications which satisfies the requirements of SAE AMS 2430, AMS 2431 and AMS 2432:

Glass bead according to AMS2431/6-AGB 6 to AGB 200 as shown in FIG. 7; and

Ceramic bead according to AMS2431/7-AZB 100 to AZB 850 as shown in FIG. 8.

A low flow rate of the media (114) through the hollow cylindrical body (104) ranges from 0.5 to 15 kg/min (kilogram per minute) or 2.2 to 28.6 lb/min (pounds per minute).

A high flow rate of the media (114) through the hollow cylindrical body ranges from 100 to 300 kg/min or 220.46 to 661.38 lb/min.

Figure 9:
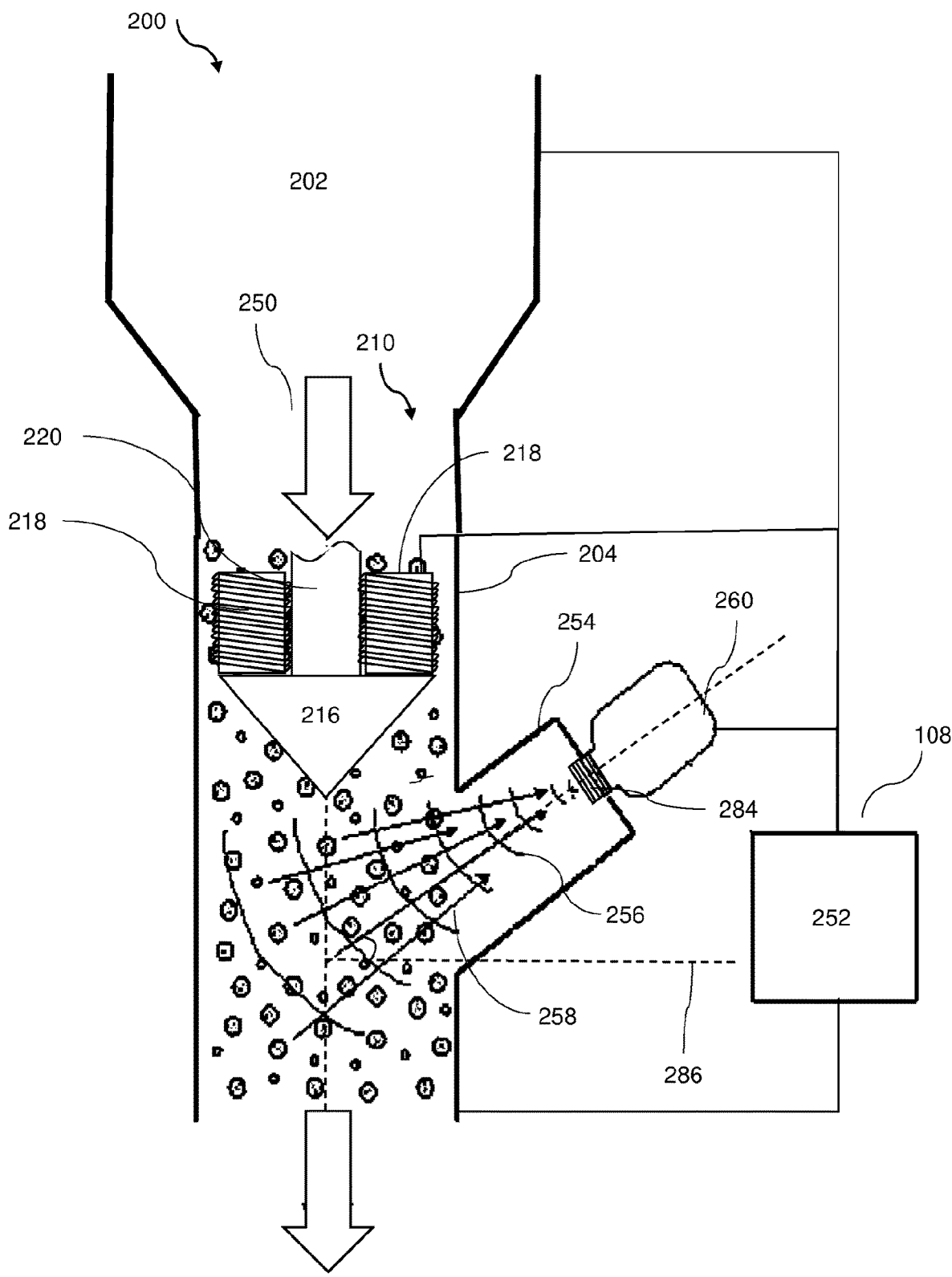
FIG. 9 illustrates a second media dosage unit.

FIG. 9 illustrates a second embodiment, which provides a cross-sectional view of the second media dosage unit (200). The second media dosage unit (200) comprises the erecting, straight hollow cylindrical body (204) with the aperture (213) along its curved surface and the hollow conduit (206) that is joined to the aperture (213) of the said hollow cylindrical body (204) at an angle forming a Y-shaped configuration.

The first end of the hollow conduit (206) is joined or notched to the aperture (213) of the hollow cylindrical body (204) forming a joint (236) whilst the second end or the opposite end is exposed. The exposed second end of the hollow body has an inner periphery which is threaded specifically a screw thread. The first end of the hollow conduit (206) is formed at an angle of twenty degrees (20°) with respect to a horizontal plane (286). The first end of the hollow conduit (206) is contoured with a two half-moons in a top-down axis with respect to the erecting, straight hollow cylindrical body (204).

Another alternative is to have a one end of a straight ratcheted rod attached to an opposite side of the hinge. A second end of the straight ratcheted rod engage with a gear. The gear is driven by an electric motor. The electric motor is controlled by the computer.

The second media dosage unit (200) comprises parts that are similar or identical to those of the first media dosage unit (100). Description of the similar or identical part is hereby incorporated by reference, wherever relevant and appropriate.

The first (100) and the second (200) media dosage units provide the means to monitor the travelling speed of the particles and to identify the type of particles that travels through the hollow cylindrical body (104 or 204).

The hollow cylindrical body (104 or 204) and the hollow conduit (106 or 206) is made of stainless steel to withstand the high travelling speed of the shot media or media (114 or 214) therein.

For the first media dosage unit (100), the hollow conduit (106) is orthogonally joined to the cylindrical hollow body (104) to prevent the media (114) from damaging the microwave transceiver unit (112). The microwave generator (142) uses a Gunn diode (172) which is used at microwave frequencies and above. The Gunn diode (172) is used in oscillators, but also used in microwave amplifiers to amplify signals. The Gunn diode (172) is a one-port (two terminal) device therefore, an amplifier circuit separates the outgoing amplified signal from the incoming input signal (reflected microwave signal) to prevent coupling.

For the second media dosage unit (200) the hollow conduit (206) is notched at an angle to the hollow cylindrical body (204) particularly in the direction (250) of the flow of the media (214). The inclined hollow conduit (206) serves two purposes, first is to monitor the flow of the media (214) from a rear position and second, the media (214) do not accumulate at the hollow cylindrical body (204) and hollow conduit joint (236) which may obstruct the detection by the microwave and requires further maintenance.

The microwave transceiver unit (212) which comprises the microwave generator (242) for producing an incident microwave signal, a microwave sensor (244) for receiving the reflected microwave signal. The detected reflected microwave signal is then sent to the computer (208) for processing. The microwave sensor (244) comprises a reflection amplifier (246) which uses a circulator to separate the signals. The circulator is a passive non-reciprocal three or four-port device, in which a microwave or radio frequency signal entering any port is transmitted to the next port in rotation (only). A bias tee is needed to isolate the bias current from the high frequency oscillations. The bias tee is a three-port network used for setting the DC bias point of some electronic components without disturbing other components. The bias tee is a diplexer.

The core assembly (210) provides regulation of the media travelling in the passage, for example, a valve. The hollow cylindrical body (204) may also incorporate an observation window along the curved surface thereof for visual monitoring of the travelling media.

The computer (208) has an algorithm residing in a memory storage. The computer (208) has a display screen for the displaying of information, an input keyboard for entering the information, a processor for computing and the memory storage for storing the different parameters and instruction sets.

The algorithm (252) contains specific instruction sets on the media flow rates for the different media, a control of the electrical current to the wound wires around the electromagnets (218) which controls the flow rates, a control to the hopper (202), a diagnostic and troubleshooting instructions of the second media dosage unit (200). The computer (208) is wired connected to the plurality of peripheral namely the microwave transceiver (260), the hopper (202), the air compressor and the electromagnets (218).

Alternatively, a wireless connection can also be used between the peripherals and the computer (208). The peripherals have RJ45 sockets. A first ends of the CAT5e twisted pair cables are connected to the RJ45 sockets and the other ends to a router or a switch. The router then communicates with the computer (208) using a wireless protocol like a Wi-Fi network protocol (IEEE 802.11). A wireless communication provides mobility for a user who can access the media dosage unit remotely. Another alternative is a use of Bluetooth.

Take for instance, in a ceramic shot peening, the algorithm (252) first dictates that an electrical current is supplied to the wires of the electromagnets (218) to allow the ceramic media to flow freely through the passage. The electromagnets (218) include the core assembly (210) at the top end.

Secondly, the algorithm (252) then controls the hopper (202) to release the ceramic media. The algorithm (252) also controls the air pressure to be introduced together with the ceramic media through the passage. The media flow rate is already pre-determined and set in the algorithm (252).

Thirdly, the microwave generator (242) fires the incident microwave signal towards the direction of the hollow cylindrical body (204). The microwave sensor (244) receives the reflected microwave signal, an algorithm (252) in the computer (208) computes the difference between the incident and the reflected microwave signal to find the travelling speed of the media (214). If there were no difference, then there is no particle detected. Conversely, if there were difference in the reflected microwave signal, there is particle detected. The difference in the received frequency is used to detect the speed of the media (214).

The media flow rate is detected using Doppler effect which is a difference between an observed frequency (reflected microwave signal), f and an emitted frequency of a wave (incident microwave signal), $f_0$.

$$f=(c+v_r/c+v_s)f_0$$

where $c=3\times10^8$ m/s is the velocity of waves in the medium; the medium is air;

$v_r$ is the velocity of the receiver relative to the medium; positive if the receiver is moving towards the source (and negative in the other direction); the receiver is the flowing media; the source is the microwave transceiver;

$v_s$ is the velocity of the source relative to the medium; positive if the source is moving away from the receiver (and negative in the other direction).

From the above formula, the speed of the flowing media, $v_r$ can be found by substituting f, $f_0$, and $v_s$.

To detect the type of medium (particle) that flows through the passage. The medium herein describes the particle or the shot particle.

First, introduce only one medium (shot particle) with a predetermined air flow into the passage. The passage is free of stoppers. The air flow speed should be constant for all medium. The air flow speed should be strong enough to provide a steady flow of medium through the passage. In other words, no vortices in the passage.

Secondly, reading the travelling speed of the medium by the microwave transceiver. The reading is displayed on the display screen of the computing device. Different medium may have the same size but the density is different and that will affect the medium flow rate. For example, for a glass bead shot particle and a steel shot particle, the steel shot particle has a higher medium flow rate compare to the glass bead shot particle. A list of medium flow rate is obtained, through iteration.

Having the list of medium flow rates of the medium stored in the memory storage, the algorithm in the computer can identify the types of shot particles flowing through the passage by comparing with the stored list of medium flow rates.

Figure 10:
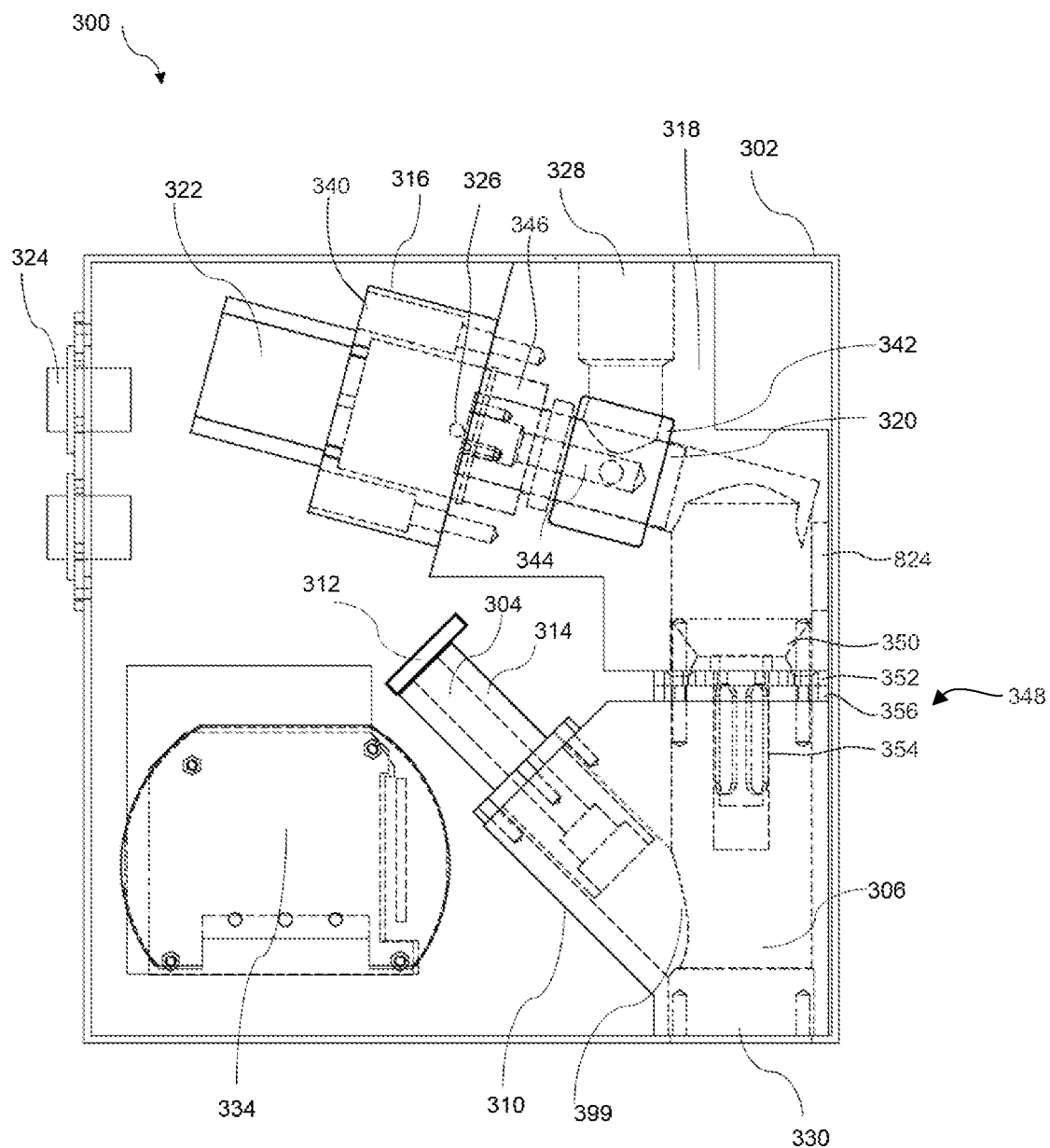
FIG. 10 illustrates a third media dosage unit.

FIGS. 10 to 22 provides a third embodiment. The third embodiment has parts that are similar or identical to those of other embodiments. Particularly, FIG. 10 illustrates a cross-sectional view of a third media dosage unit (300). The third media dosage unit (300) is assembled inside a casing (302). The third media dosage unit (300) comprises a microwave flow sensor (304) for measuring flow rate of shot particles, a shot circulation conduit (306) and a sensor connector (308) (not shown). The microwave flow sensor (304) is encapsulated in a sensor detection body (310). One end of the sensor detection body (310) is coupled to the shot circulation conduit (306) via the sensor connector (308). Similar to the second media dosage unit (200), the sensor detection body (310) and the shot circulation conduit (306) form a Y-shape configuration. The other end of the sensor detection body (310) is covered by a microwave sensor head (312), which is a microwave transceiver. In particular, the microwave flow sensor (304) comprises a sensor guider (314) for altering or adjusting flow pattern of the media stream of solid particles.

The third media dosage unit (300) further comprises a media flow valve (316) for regulating the media stream. The media flow valve (316) is encapsulated in a valve body (318). One end of the valve body (318) is connected to the shot circulation conduit (306) via a valve bar (320). The valve bar (320) is adopted also for sealing the interface of the valve body (318) and the shot circulation conduit (306) to prevent any leakage of the shot particles. Thus, the valve bar is adopted for regulating flow of the shot particles. Particularly, a longitudinal axis of the media flow valve (316) is tilted and not horizontal, especially when the media dosage unit is in use or installed. The stepper motor (322), the proximity sensor (326), the rubber silicon (342) and the valve bar (320) share the same longitudinal axis. In fact, the valve bar (320) is adapted, operable or configured to carry the rubber silicon (342) as a plunger (320, 342), which opens or closes the opening (328). Shots or solid particles are prevented from staying on top of the plunger (320, 342), which may cause issue of closing of the media flow valve (316). The media flow valve (316) is controlled by the stepper motor (322). When the media flow valve (316) is opened by the stepper motor (322), the media stream can pass through the media flow valve (316) and then flow into the shot circulation conduit (306) for shot peening. The valve body (318) is coupled to the casing (302) via two valve connectors (324). The media flow valve (316) further has a proximity sensor (326). The proximity sensor (326) is able to detect the presence of nearby objects without any physical contact such that the opening status of the media flow valve (316) can be closely monitored and precisely controlled without any physical interference. In this way, the flow rate of shot stream can be controlled by the media flow valve (316) without physical touching, known as contactless.

The shot media is provided to the third media dosage unit (300) from a media inlet (328) at the top side of the casing (302). The shot media then pass the media flow valve (316), flow along the shot circulation conduit (306) and then moves outside through a media outlet (330). In addition, a flow separator (348) such as a media filter (332) is also installed inside the shot circulation conduit (306) for scattering the shot particles more uniform. In particular, the flow separator (348) such as the media filter (332) is located before the microwave flow sensor (304) such that the signal reflects better the flow rate of shot media. The flow separator (348) will be elucidated in detail in FIG. 11 in terms of structure and function.

The third media dosage unit (300) further comprises a main controller circuit board (334) within the casing (302). The main controller circuit board (334) has a programmable controller that is connected to the microwave flow sensor (304) and the media flow valve (316) to form a closed-loop control system. An abnormal flow rate that deviates from the pre-set value in the main controller circuit board (334) can be adjusted back the pre-set value. The main controller circuit board (334) is also electrically communicated with some peripheral device such as a monitor or a keyboard.

The third media dosage unit (300) may have a protector (not shown) attached at an interface (399) of the flow sensor (304) and the circulation conduit (306) for protecting the flow sensor (304). The protector is made of polyurethane (PU) that is resistant to shot particles and also transparent to microwave.

Figure 11:
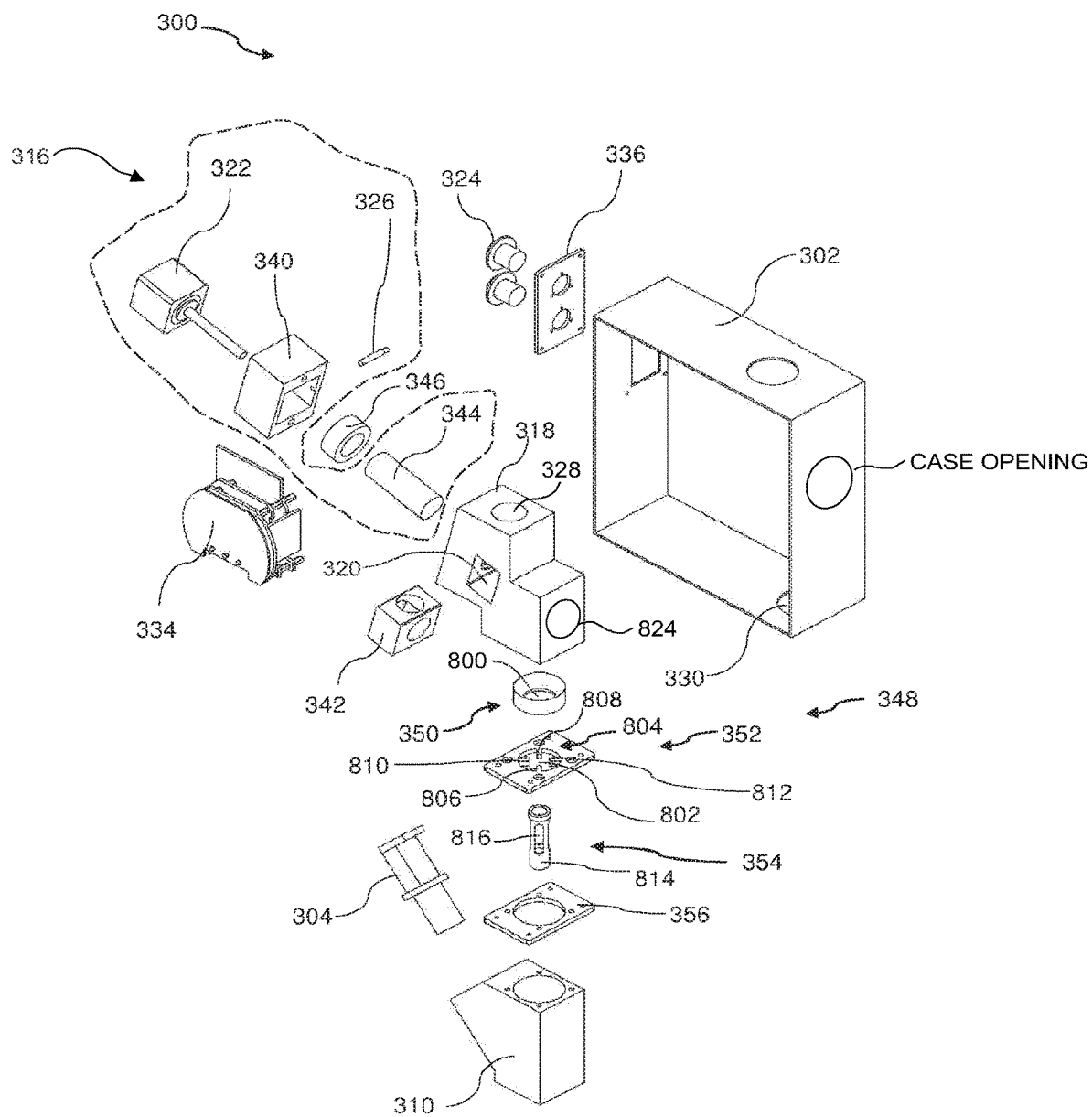
FIG. 11 illustrates an exploded view of the third media dosage unit.

FIG. 11 illustrates an exploded view of the third media dosage unit (300). Some components of the third media dosage unit (300) in FIG. 10 are separately shown here for more details. For example, a valve connector side plate (336) is used in assistance to the valve connector (324) for fixing the valve body (318) to an opening (338) on the upper left side of the casing (302). A proximity sensor mounting apparatus (340) is also used for mounting the proximity sensor (326) into the media flow valve (316). A regulator pin (344) is adopted for regulating the valve bar (320) of the media flow valve (316). The regulator pin (344) is a long bar with two ends. A first end of the regulator pin (344) is connected to the valve bar (320) and a second end is connected to the stepper motor (322). In this way, the stepper motor (322) controls the movement of the regulator pin (344), the valve bar (320) and further controls the media flow valve (316) for shot peening. When the regulator pin (344) pushes the valve bar (320) forward and the valve bar (320) would block the media inlet (328), the media flow valve (316) is thus closed for shot peening. When the regulator pin (344) pulls the valve bar (320) backward, the media inlet (328) is partially or completely opened, and the media stream can thus flow through the media flow valve (316). A Teflon sliding bearing bush (or sliding bush for short) (346) and a rubber silicon (342) are installed for holding the regulator pin (344). The regulator pin (344) is just fit into the Teflon sliding bearing bush (346) and the silicon rubber (342) such that the regulator pin (344) moves freely forward and backward and meanwhile any foreign material such as dust or air is blocked outside. In addition, lubricant may be applied to the regulator pin (344) for promoting the movement inside the Teflon sliding bearing bush (346) and the silicon rubber (342). The regulator pin (344) is optionally made of polyurethane (PU) that is resistant to shot particles Particular, the media flow valve (316) is installed to the media inlet (328) at an angle forming a Y-shaped configuration. The angle is measured between a virtual axis of the media flow valve (316) and the virtual axis of the media inlet (328). The angle can be in a range of 20 to 80 degrees. In this design, the media shots would roll back when accidently flow outside the media inlet (328). And thus the media shots would not accumulate at the media flow valve (316), which makes the media stream stable.

Preferably, a silicone rubber sheet (not shown) is installed around the microwave flow sensor (304) for absorbing microwave with a frequency ranging from 6 GHz and above. When bonded to surfaces of the ferrous shot particles, the silicone rubber sheet would significantly reduce the reflectivity of microwave signal due to the flow of microwave currents on the surfaces. The silicon rubber sheet has an advantage of being impervious to moisture and thus can be subjected to high altitudes, with no adverse effects; and another advantage of being very flexible to be conformed to any contoured surface.

The third media dosage unit (300) has the flow separator (348) such as the media filter (332) as a third independent spreader (also known as third spreader or simply spreader) for altering distribution pattern of the solid particles. The flow separator (348) is either detachably or permanently installed inside the circulation conduit (306). Preferably, the flow separator (348) is installed before the microwave flow sensor (304) such that the measured flow rate of the shot media is more accurate for ferrous shot particles. The flow separator (348) further comprises a flow separator top (350), a flow separator mid (352), a flow separator bottom (354). The flow separator top (350) and the flow separator bottom (354) are installed on and inside the flow separator mid (352) respectively. Both of the flow separator mid (352) and the flow separator bottom (354) have openings, holes or perforations for scattering or deforming shot media. Preferably, the flow separator (348) has a symmetric structure such that the media shots are scattered uniformly when passing through the flow separator (348).

As shown in FIG. 11, the flow separator top (350) has a ring shape comprising a third through hole (800) from a top surface to a bottom surface. The flow separator mid (352) has a plate shape comprising a fourth through hole (802) from a top surface to a bottom surface and an internal structure (804) extending into the fourth through hole (802). The internal structure (804) further comprises four protruding parts extending into the fourth through hole (802): a first protruding part (806) on the front side, a second protruding part (808) on the back side, a third protruding part (810) on the left side and a fourth protruding part (812) on the right side. Therefore, the flow separator mid (352) has a symmetric design for scattering the media shots uniformly. And the flow separator bottom (354) is a hollow tube with a closed bottom side. The flow separator bottom (354) has four elongated openings on a cylindrical side surface (814) for scattering the solid particles uniformly: a first elongated opening (816) on the front side, a second elongated opening on the back side (not shown), a third elongated opening on the left side (not shown) and a fourth elongated opening on the right side.

As discrete components, the flow separator bottom (354) can be installed into the fourth through hole (802) of flow separator mid (352) for forming the flow separator (348) as a whole. More specifically, a top portion of the flow separator bottom (356) above the four elongated openings (816, 818, 820 and 822) just fits into the internal structure (804) of the flow separator mid (352). As a result, the flow separator bottom (356) is firmly fixed by the four protruding parts (806, 808, 810 and 812) of the flow separator mid (352). Alternatively, the flow separator (348) can be made as a unitary apparatus.

When the media stream passing through the flow separator (348), the media shots enter into the third through hole (800) of the flow separator top (350). Then the media stream flows through the fourth through hole (802) and meanwhile is scattered by the internal structure (804) of the flow separator mid (350). Finally, the scattered media stream flows out of the flow separator bottom (354) from the four elongated openings (816, 818, 820 and 822). In this way, the scattered media stream is further deformed by the flow separator bottom (354). Particularly, since both the flow separator mid (352) and the flow separator bottom (354) are symmetric, the scattered solid particles are uniformly distributed across the circulation conduit (306).

In addition, the flow separator (348) is required to be held and maintained in position in a strengthened manner such that the flow separator (348) can resist numerous collisions with the shot particles. A flange cover (356) is thus preferably installed for holding the flow separator (348) and protecting a full face or just the raised face portion of the flow separator (348). The flange cover (356) can be a mounting plate.

Figure 12:
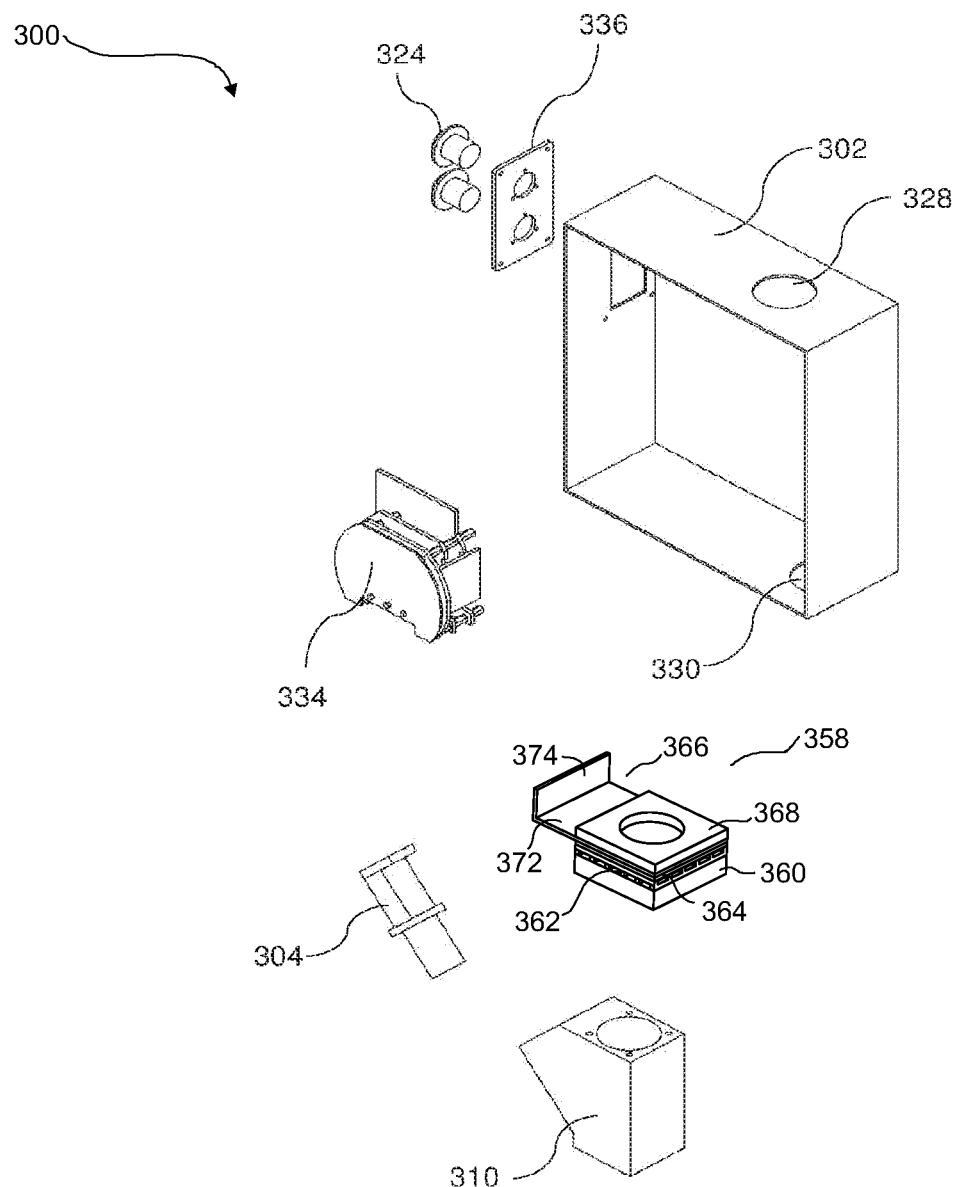
FIG. 12 illustrates a first media flow valve for the third media dosage unit.

FIG. 12 illustrates a schematic diagram of a first assembled media flow valve (358) for the third media dosage unit (300). The first assembled media flow valve (358) comprises a holder having a through hole for aligning with the shot circulation conduit in order to transfer shot peening particles via the through hole; and a shutter supported by and lined up with the holder. The holder further comprises a base plate (360) at the bottom for providing mechanical support for the first assembled media flow valve (358) as a whole; a mesh (362) placed on the base plate (360) as a spreader for scattering or deforming shot media, especially for ferrous shot particles; and a bottom plate (364). While the shutter comprises a valve pulley (366) and a top plate (368) placed on the mesh (362) in sequence from bottom to top. The valve pulley (366) is movable between the bottom plate (364) and the top plate (368). In particular, the bottom plate (364) is parallel to and in direct contact with the mesh (362). The first assembled media flow valve (358) has a simple structure and thus is easy to make and maintain.

The mesh (362) can be of one of many commercially sold types, such as a wire type or a bar type (e.g. rebar). The opening pattern of the mesh has many options, such as quadrilateral shapes including square opening, rectangular opening and diamond opening, or round opening or their mixtures. The size of the opening also has a wide range of choices and is determined by the working parameters such as the ferrous shot peening particles, the shot flow intensity, the exposure time and the properties of the targeted work piece. In addition, the mesh can be composed of one or several overlapping layers for flexibility in design; and the layers can also be of the same or different patterns mentioned below, including material, type and size of opening. Furthermore, there is also a requirement for the thickness of the mesh for a better control. If the mesh is too thin, it is easy to be destroyed and not able to last long; while if the mesh is too thick, the velocity of the shots will be lost too much for required dimples. It is also admitted that the addition of mesh in the control valve may limit the flexibility of control valve design because the maximum of flow rate may be reduced.

Figure 13:
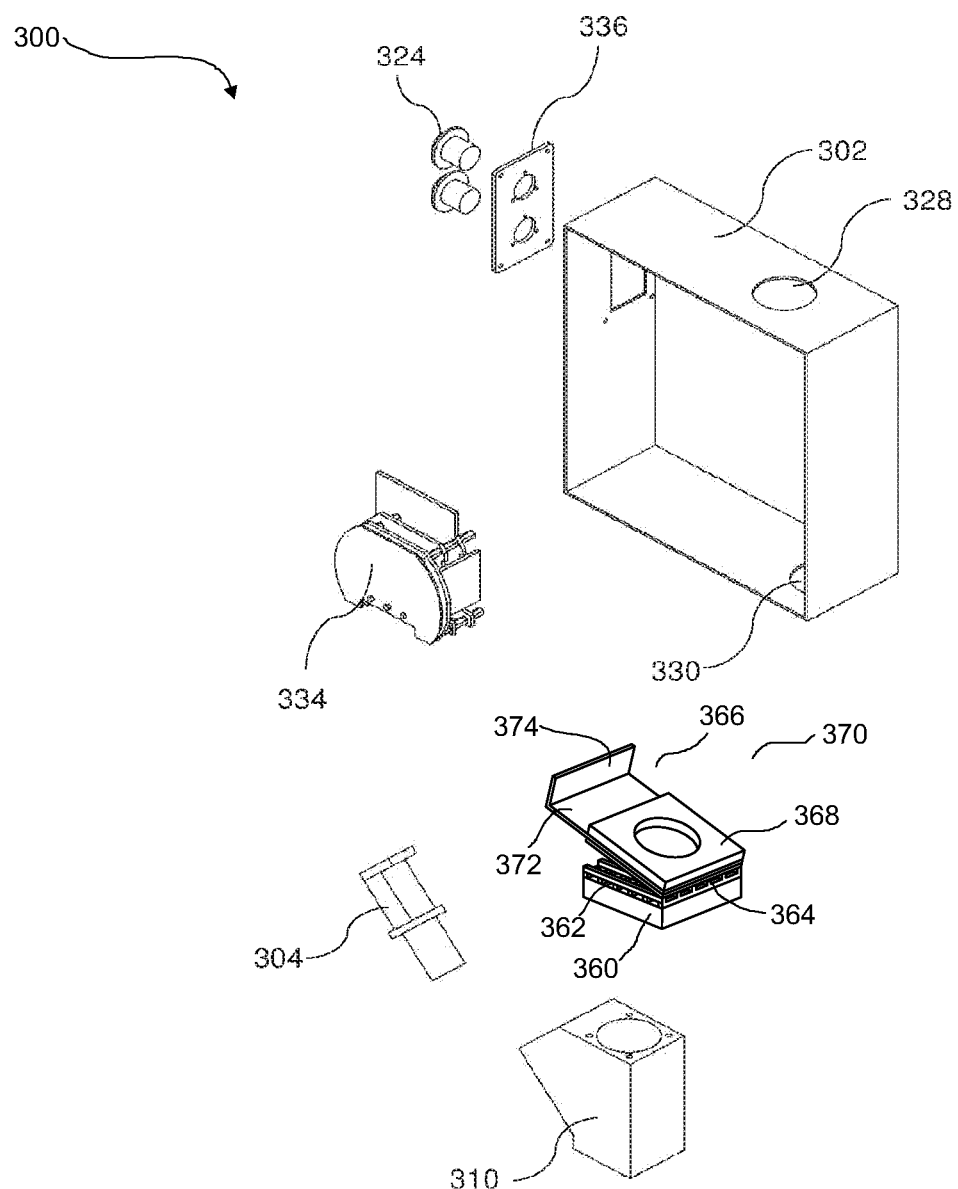
FIG. 13 illustrates a second media flow valve for the third media dosage unit.

FIG. 13 illustrates a schematic diagram of a second assembled media flow valve (370) for the third media dosage unit (300). Similar to the first assembled media flow valve, the second assembled media flow valve (370) comprises the base plate (360), the mesh (362), the bottom plate (364), the valve pulley (366) and the top plate (368) in sequence from bottom to top. In contrast, the bottom plate (364) installed to the mesh (362) and the base plate (360) at an angle forming a Y-shaped configuration. In other words, the bottom plate (364), the valve pulley (366) and the top plate (368) are tilted to the mesh (362) and the base plate (360). The second assembled media flow valve (370) has an advantage that shot particles would be prevented from being stuck at the edges and allowed to roll back to the centres. The bottom plate (364) is tilted to the mesh (364) with a tilt angle in a range of 20 to 80 degrees, with the help of one or more mechanical supports (not shown). The top end and the bottom end of the mechanical support are secured to the bottom plate (364) and the mesh (362), respectively. The title angle is adjustable for different working conditions. The mechanical support may be a common window or door hinge, such as butt hinge, barrel hinge, piano hinge, butterfly hinge, flush hinge, pivot hinge, barrel hinge, or spring hinge. Alternatively, the bottom plate and the mesh are bound together by a friction hinge which has sufficient friction or resistance to hold the bottom plate slightly against gravity.

In both FIG. 12 and FIG. 13, the valve pulley (366) has a shape of the capital letter "L", including a long portion (372) and a shorter portion (374) substantially vertical to the long portion (372). The long portion (372) of the valve pulley (366) is partially sandwiched between the bottom plate (364) and the top plate (368), and can move inward and outward manually or automatically. Both of the long portion (372) and the short portion (374) have a rectangular shape in FIG. 12 and FIG. 13. Alternatively, the shapes and dimensions of the long portion (372) and the short portion (374) may vary according to the requirement of specific working conditions. Particular, since the bottom plate (364) is slightly titled in FIG. 13, the valve pulley (366) installed on the bottom plate (364) is also titled to the same degree. In both FIG. 12 and FIG. 13, the top plate (368) is a solid slab that moves along with the valve pulley (366).

The assembled media control valve (358 or 370) can be installed either horizontally or vertically to the shot circulation conduit (306). When horizontally installed, the mesh (362) of the assembled media control valve (358 or 370) directly faces the media stream. While vertically installed, the mesh (362) is parallel to the media stream. Preferably, the assembled media control valve is horizontally installed and shows an almost perfect linear upward line after the flow rate reaches at 3 kg/min. In contrast, the test graph for the assembled media control valve (358 or 370) vertically installed deviates from a linear region.

In order to use the ferrous shot media for the third media dosage unit (300), a special microwave flow sensor (304) is designed for regulating the stream of ferrous shot particles. The microwave flow sensor (304) is able to provide feedback to the media control valve (316) and thus form a closed loop control for regulating the stream of ferrous media shots.

Figure 14:
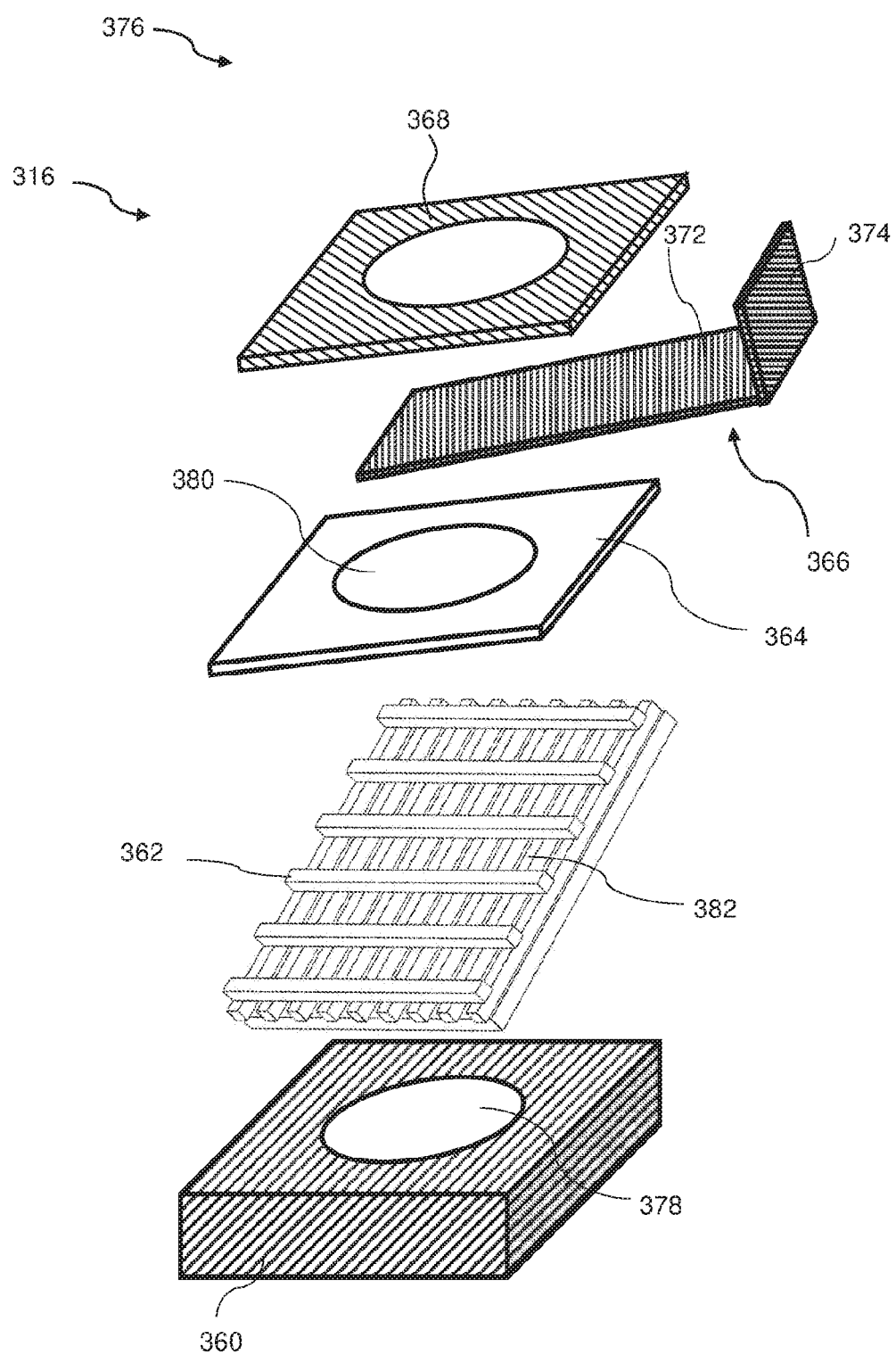
FIG. 14 illustrates an exploded view of a first embodiment of the media flow valve.

FIG. 14 illustrates an exploded view of a first embodiment (376) of the media flow valve (316) that is either the first assembled media flow valve (358) or the second assembled media flow valve (370). The base plate (360) and the bottom plate (364) have a first through hole (378) and a second through hole (380) respectively. The first through hole (378) and the second through hole (380) can overlap for forming a path for the stream of shot media to flow through. In particular, the second through hole (380) has a round shape; while the first through hole (378) can be of any shape, such as also a round shape shown in FIG. 14. The size of the first through hole (378) 25 mm to 60 mm; while the size of the second through hole (380).

As shown in FIG. 14, the mesh (362) is a wire mesh with square openings (382). The wire can be made of metals such as cast steel that has the property of high resistance to stiff ferrous shot peening particles. As a result, the metal mesh can be durable for a long time operation without changing the metal mesh. The metal wire can be either woven or welded together; and the mesh has a greater hardness for bombardment of ferrous shot peening particles. The square opening (382) has a length of each side or the spacing between adjacent parallel sides that is determined by the size of ferrous shot peening particles and other working condition. The mesh (362) in FIG. 14 has a thickness of 2 mm to 10 mm.

Alternatively, the mesh (362) may be made of nylon wire that is either woven or crimpled. Compared with the cast steel wire, the mesh (362) of nylon wire has less weight and thus is particularly suitable for mobile applications. In addition, the nylon material is known to be resistant to either acid or alkaline chemicals and thus the nylon mesh is applicable under a hash working condition. For example, when the object or work piece is contaminated with acid or alkaline chemicals on the surface. If the shot particles are collected and re-used, the mesh may be eroded or even damaged by the contaminated shot particles. In contrast to the metal mesh, the spacing between adjacent parallel sides of the nylon mesh is easily adjustable due to the flexible nature of nylon material. Preferably, a mixed mesh can be made by combining the advantages of the metal mesh and the nylon mesh. For example, the mixed mesh has a top nylon layer for resistance of chemicals and a cast steel bottom layer for mechanical support.

Figure 15:
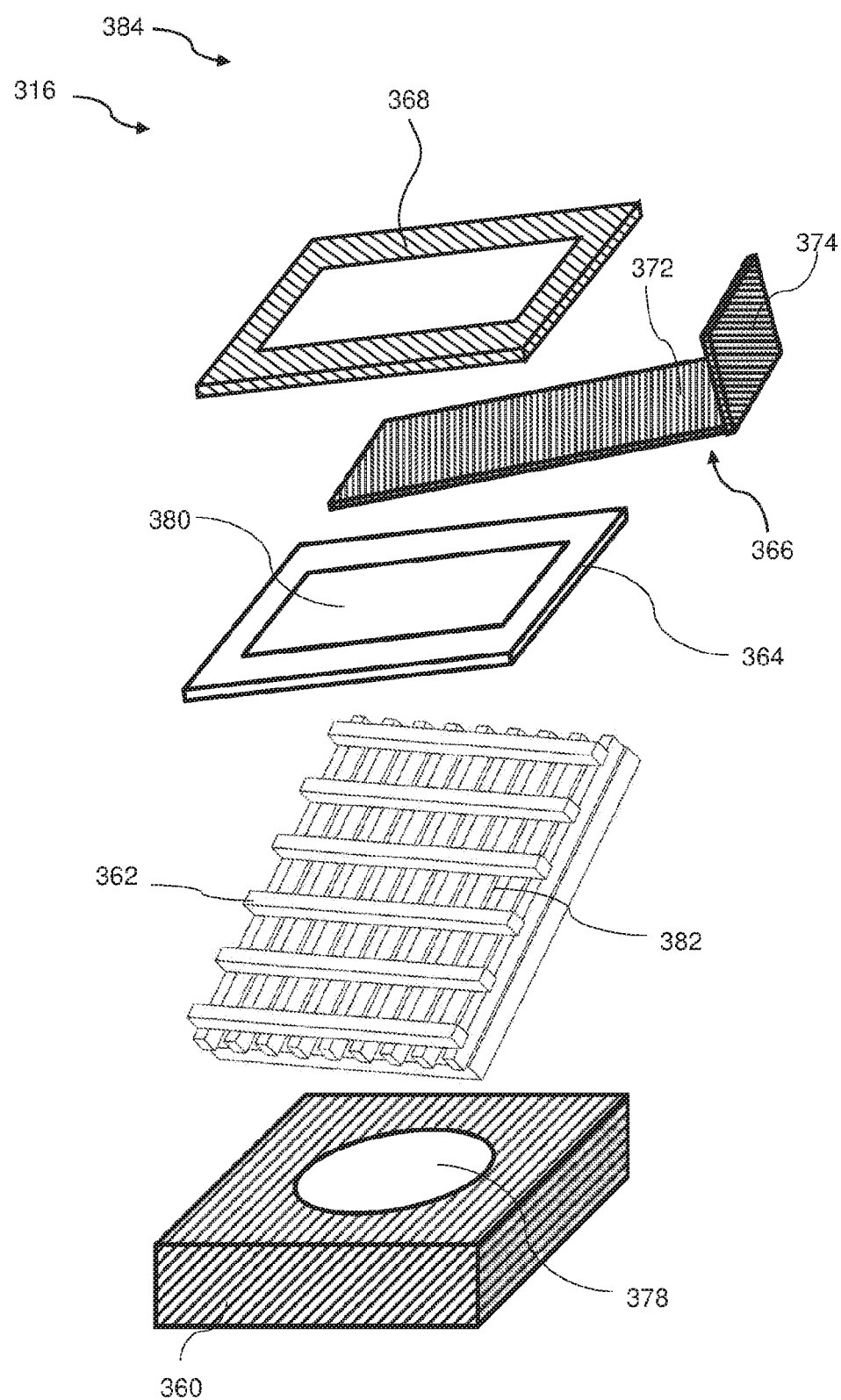
FIG. 15 illustrates an exploded view of a second embodiment of the media flow valve.

FIG. 15 illustrates an exploded view of a second embodiment (384) of the media flow valve (316) that is either the first assembled media flow valve (358) or the second assembled media flow valve (370). In contrast to the first embodiment (376), the second through hole (380) has a rectangular shape. The second through hole (380) has a size that is same as or similar to the first through hole (378).

It is sometimes observed that the shot media deviates from a homogenous stream after the media flow valve (316), when the flow rate reaches a certain threshold. The faster the flow speed is, the more greatly the shot media deviate. For example, for a shot media of S110 peening shot, when the flow rate reaches 4 kg/min, the shot stream starts to deviate from the centre of the shot circulation conduit (306); when the flow rate increases to 6 kg/min, the shot stream begin to concentrate on one side; and when the flow rate comes to 8 kg/min, the shot media collides on the internal wall of the shot circulation conduit (306) shortly after the shot media passes the media flow valve (316).

Figure 16:
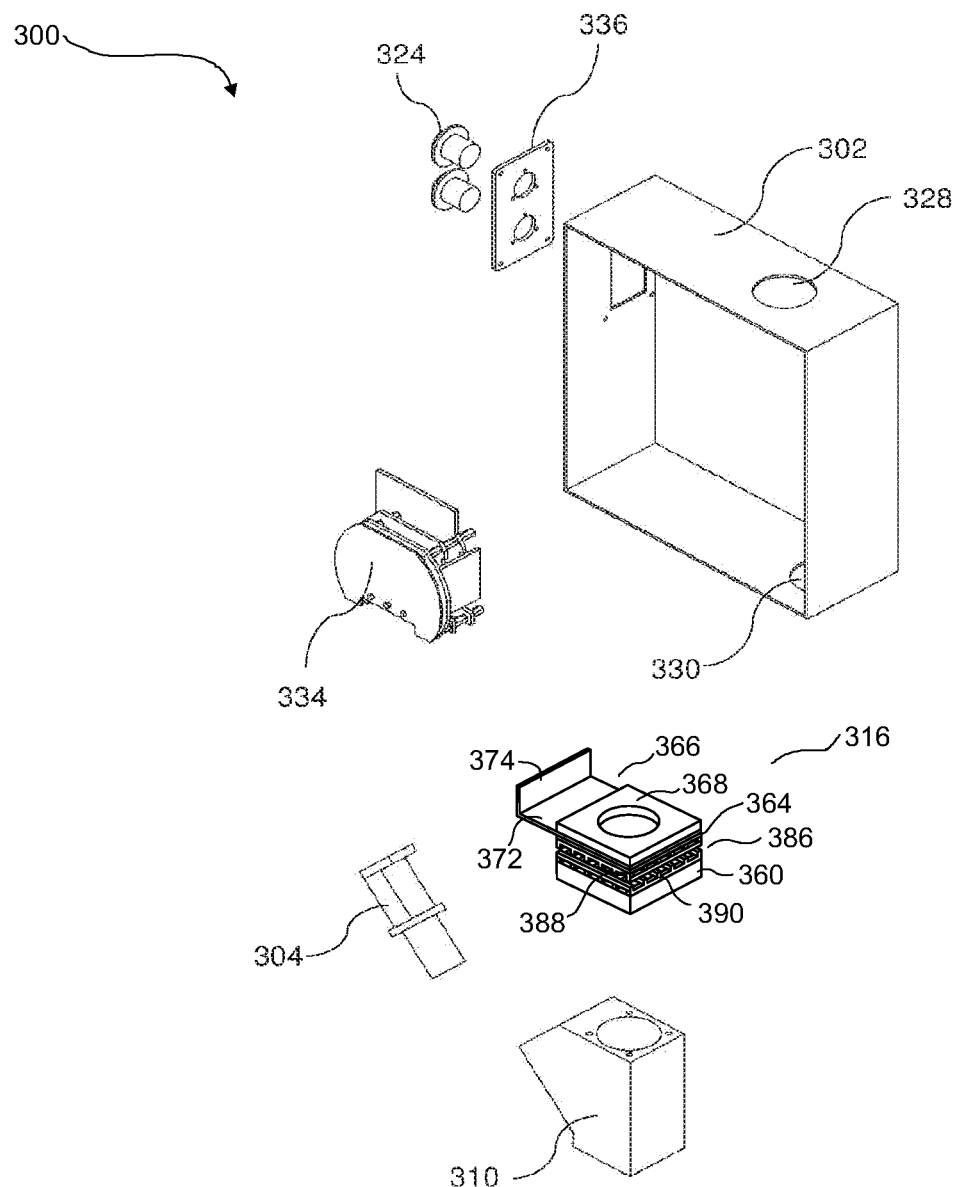
FIG. 16 illustrates a double mesh for the media flow valve.
Figure 17:
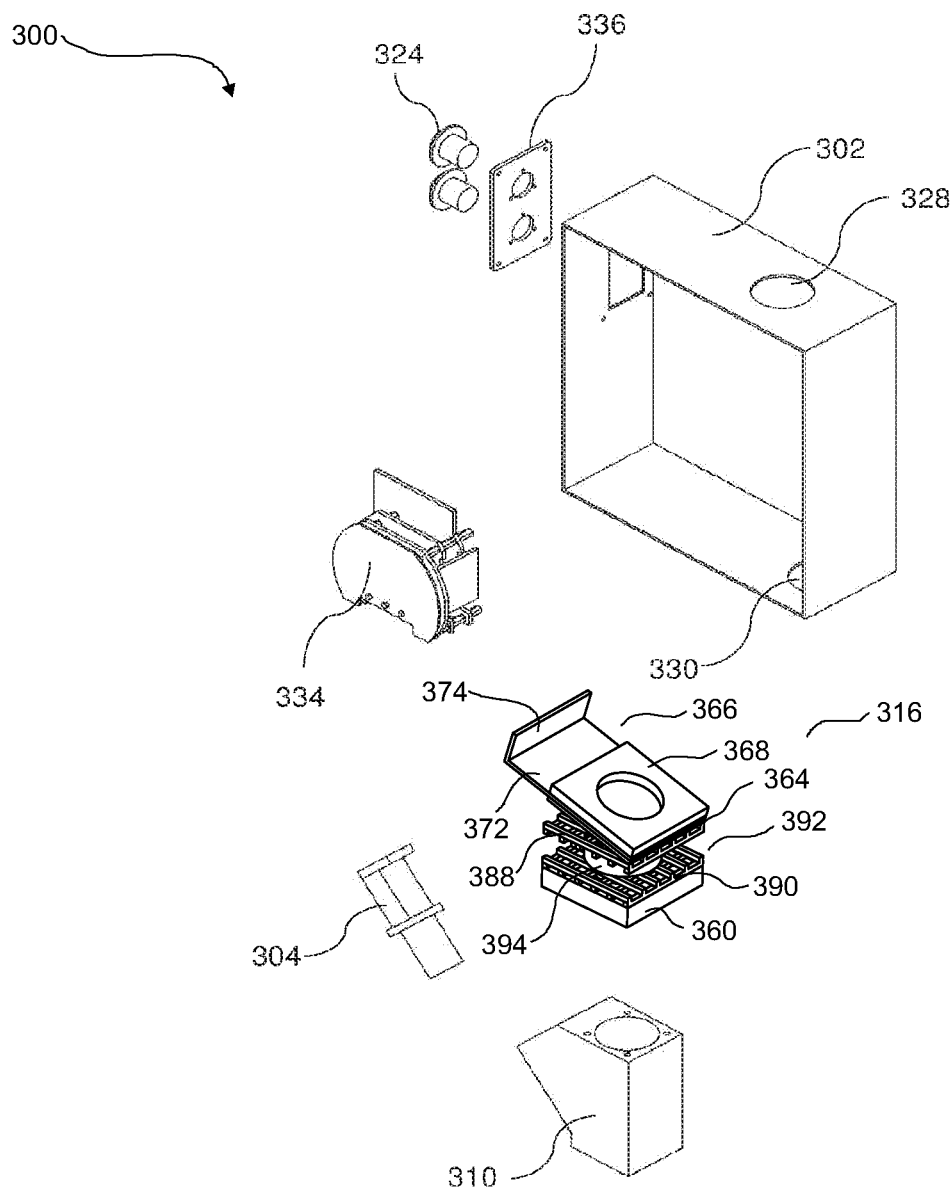
FIG. 17 illustrates a double mesh with a spacer for the media flow valve.

FIG. 16 and FIG. 17 illustrates a double mesh installed in the media flow valve to overcome the issue of deviation. The double mesh is installed in the media flow valve (316), instead of the single mesh (362) shown in FIG. 14 or FIG. 15. In FIG. 16, a first double mesh (386) comprises a top mesh (388) and a bottom mesh (390). The top mesh (388) is directly stacked on top of the bottom mesh (390). Alternatively, FIG. 17 shows a second double mesh (392) wherein a spacer (394) is inserted between the top mesh (388) and the bottom mesh (390). The second double mesh (392) allows the shot media to ricochet, and thus makes the shot media smoother and more homogenous. The top mesh (388) and the bottom mesh (390) can be any mesh that is disclosed for the single mesh (362) In addition, the top mesh (388) and the bottom mesh (390) can optionally be of a same or different type. The spacer is made of steel, and has a square shape and a height 10 to 40 mm.

Figure 18:
FIG. 18 illustrates a test graph using the one media flow valve in the third media dosage unit.
Figure 19:
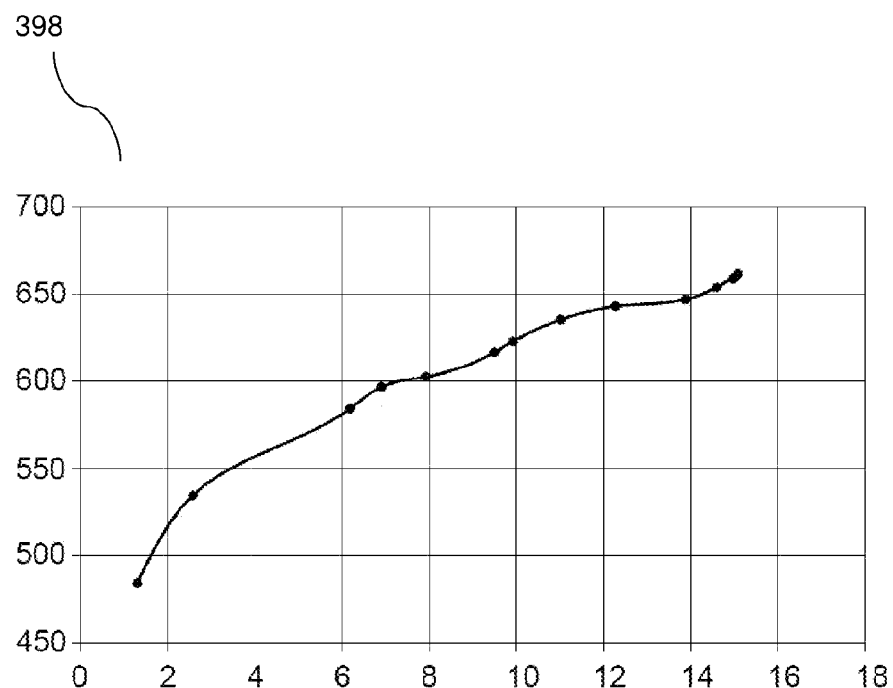
FIG. 19 illustrates a test graph using the another media flow valve in the third media dosage unit.

For shot media of ASR 230, FIG. 18 and FIG. 19 illustrate test graphs where the media flow valve (316) is horizontally installed to the shot circulation conduit (306) in the third media dosage unit (300). In FIG. 18, a first graph (396) shows an upward linear trend along with an increasing speed when the second through hole (380) of the bottom plate (364) has a round shape. In FIG. 19, a second graph (398) shows also an upward linear trend along with an increasing speed when the second through hole (380) of the bottom plate (364) has a square shape. Compared with the first graph (396), the second graph (398) is relatively steeper. In other words, it is easier to control the shot media to flow in a linear region for a rectangular second through hole (380). Therefore, the rectangular second through hole (380) is preferred for the bottom plate (364) for easier control and more accurate measurement. For example, when the flow rate reaches 15 kg/min, the media flow valve (316) with a round second through hole (380) is difficult to control the shot media within the linear region. In addition, the bottom plate (364) is preferred to be slightly tilted against the mesh (362) for preventing the ferrous shot particles to be stuck at the edges by allowing the ferrous shot particles to roll back to the mesh (362) below.

Figure 20:
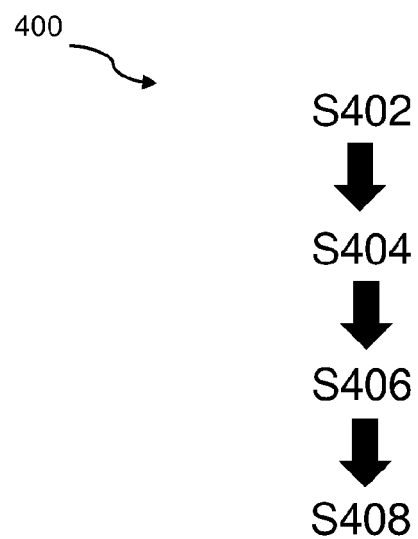
FIG. 20 illustrates a method of using the media dosage unit for shot peening.

FIG. 20 illustrates a method of using the third media dosage unit (300) for shot peening (400). The method (400) comprises a first step (S402) of providing a ferrous shot media. The method (400) comprises a second step (S404) of accelerating and decelerating the ferrous shot media to a predetermined speed (or a flow rate). The method (400) comprises a third step (S406) of measuring the flow rate of the ferrous shot media. The third step (S406) further comprises installing, repairing, patching, examining, testing or replacing a microwave flow sensor (304). The method (400) comprises a fourth step (S408) of directing the ferrous shot media to an object for treating surface of the object.

Figure 21:
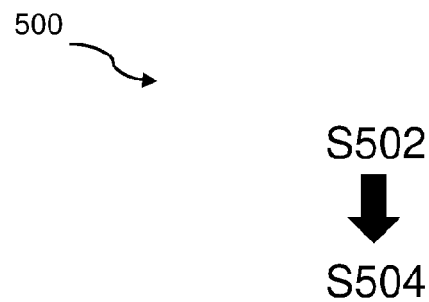
FIG. 21 illustrates a method of making or assembling the media dosage unit for shot peening.

FIG. 21 illustrates a method (500) of making or assembling the third media dosage unit (300) for shot peening. The method (500) comprises a first step (S502) of providing a microwave flow sensor (304) for measuring flow rate of solid particles (also known as shot streams). The method (500) comprises a second step (S504) of coupling the microwave flow sensor (304) to the shot circulation conduit (306) with a sensor connector (308).

Figure 22:
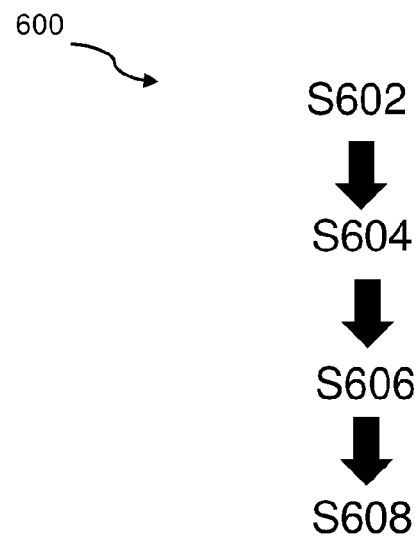
FIG. 22 illustrates a method of making or assembling the media flow valve.

FIG. 22 illustrates a method (600) of making or assembling the media flow valve. The method (600) comprises a first step (S602) of providing the base plate (360) with a first through hole (378). The base plate (360) provides mechanical support for the media flow valve as a whole. The method (600) comprises a second step (S604) of installing the bottom plate (364) with a second through hole (380) on the base plate (360). The method (600) comprises a third step (S606) of installing the valve pulley (366) on the bottom plate (364). The method (600) comprises a fourth step (S608) of installing a top plate (368) on the valve pulley (366) and above the bottom plate (364).

In particular, for the ferrous shot media, the method (600) further comprises a fifth step of installing a mesh (362) such as a wire mesh as the second spreader between the base plate (360) and the bottom plate (364) for deforming the ferrous shot media. The ferrous stream is expected to be evenly distributed after passing through the mesh (362).

Figure 23:
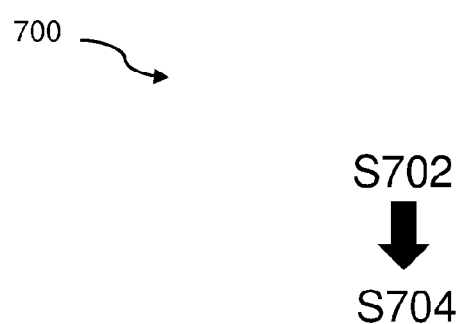
FIG. 23 illustrates a method of maintaining the media dosage unit.

FIG. 23 illustrates a method (700) of maintaining the media dosage unit. The third media dosage unit (300) comprises the flow separator (348) as the first spreader and the mesh (362) as the second spreader. The flow separator (348) and the mesh (362) can work independently and alternatively such that either of the flow separator (348) or the mesh (362) can be replaced while the third media dosage unit is not stopped. For example, when the flow separator (348) is damaged, the method (700) comprises a first step (S702) of extracting the flow separator (348) out of the microwave flow sensor (304). The method (700) comprises a second step (S704) of inserting the mesh (362) into the media flow valve (316) between the base plate (360) and the bottom plate (364). In this way, the third shot media unit (300) is not stopped for replacing the flow separator (348).

In the application, unless specified otherwise, the terms "comprising", "comprise", and grammatical variants thereof, intended to represent "open" or "inclusive" language such that they include recited elements but also permit inclusion of additional, non-explicitly recited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. The description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

REFERENCE NUMERALS

| | | | |
|---|---|---|---|
| 100 | first media dosage unit; | 102 | hopper; |
| 104 | hollow cylindrical body; | 106 | hollow conduit; |
| 108 | computer; | 110 | core assembly; |
| 112 | microwave transceiver unit; | 113 | aperture; |
| 114 | shot media; | 116 | conical member; |
| 118 | electromagnet; | 120 | permanent magnet; |
| 122 | housing; | 124 | apex; |
| 126 | base; | 128 | struts; |
| 130 | first strut; | 132 | second strut; |
| 134 | third strut; | 136 | joint; |
| 138 | lid; | 140 | round opening; |
| 142 | a microwave generator; | 144 | a microwave sensor; |
| 146 | reflection amplifier; | 148 | power source; |
| 150 | direction of media flow; | 152 | algorithm/mass flow rate; |
| 154 | hollow tube; | 156 | incident beam; |
| 158 | reflected beam; | 160 | microwave transceiver; |
| 162 | modulator; | 164 | local oscillator; |
| 166 | mixer; | 168 | tuning screws; |
| 169 | waveguide; | 170 | varicap diode; |
| 172 | gunn diode; | 174 | cavity; |
| 176 | cavity tuning screw; | 178 | iris; |
| 180 | gunn transmitter; | 182 | fluid; |
| 200 | second media dosage unit; | 202 | hopper; |
| 204 | hollow cylindrical body; | 206 | hollow conduit; |
| 208 | computer; | 210 | core assembly; |
| 212 | microwave transceiver unit; | 213 | aperture; |
| 214 | shot media; | 218 | electromagnet; |
| 236 | joint; | 242 | a microwave generator; |
| 244 | a microwave sensor; | 246 | reflection amplifier; |
| 250 | direction of media flow; | 252 | algorithm; |
| 254 | hollow tube; | 256 | incident beam; |
| 258 | reflected beam; | 260 | microwave transceiver; |
| 284 | screw thread; | 286 | a horizontal plane; |
| 300 | third media dosage unit; | 302 | casing; |
| 304 | microwave flow sensor; | 306 | shot circulation conduit; |
| 308 | sensor connector (not shown); | 310 | sensor detection body; |
| 312 | microwave sensor head; | 314 | sensor guider; |
| 316 | media flow valve; | 318 | valve body; |
| 320 | valve bar; | 322 | stepper motor; |
| 324 | valve connector; | 326 | proximity sensor; |
| 328 | media inlet; | 330 | media outlet; |
| 332 | media filter; | 334 | main controller circuit board; |
| 336 | a valve connector side plate; | 338 | opening; |
| 340 | proximity sensor mounting apparatus; | 342 | rubber silicon; |

-continued

| | | | |
|---|---|---|---|
| 344 | regulator pin; | 346 | Teflon sliding bearing bush; |
| 348 | flow separator; | 350 | flow separator top; |
| 352 | flow separator mid; | 354 | flow separator bottom; |
| 356 | flange cover; | 358 | first assembled media flow valve; |
| 360 | base plate; | 362 | mesh; |
| 364 | bottom plate; | 366 | valve pulley; |
| 368 | top plate; | 370 | second assembled media flow valve; |
| 372 | long portion; | 374 | short portion; |
| 376 | first embodiment of the media flow valve; | 378 | first through hole; |
| 380 | second through hole; | 382 | square opening; |
| 384 | second embodiment of the media flow valve; | 386 | first double mesh; |
| 388 | top mesh; | 390 | bottom mesh; |
| 392 | second double mesh; | 394 | spacer; |
| 396 | first graph; | 398 | second graph; |
| | | 399 | interface; |
| 400 | method of using the third media dosage unit; | S402 | first step of the method 400; |
| S404 | second step of the method 400; | S406 | third step of the method 400; |
| S408 | fourth step of the method 400; | 500 | method of making or assembling the third media dosage unit; |
| S502 | first step of the method 500; | S504 | second step of the method 500; |
| 600 | method of making or assembling the media flow valve; | S602 | first step of the method 600; |
| S604 | first step of the method 400; | S606 | first step of the method 400; |
| S608 | first step of the method 400; | 700 | method of maintaining the third media dosage unit; |
| S702 | first step of the method 700; | S704 | first step of the method 700; |
| 800 | third through hole | 802 | fourth through hole; |
| 804 | internal structure; | 806 | first protruding part; |
| 808 | second protruding part; | 810 | third protruding part; |
| 812 | fourth protruding part; | 814 | cylindrical side surface; |
| 816 | first elongated opening; | 818 | second elongated opening; |
| 820 | third elongated opening; | 822 | fourth elongated opening; |

The invention claimed is:

1. A media dosage unit for shot peening, the media dosage unit comprising:
   a microwave flow sensor for measuring flow rate of ferrous solid shot peening particles,
   wherein the microwave flow sensor comprises a sensor guider for altering or adjusting flow pattern of a media stream of the ferrous solid particles;
   a connector on the microwave flow sensor for coupling the microwave flow sensor to a shot circulation conduit, wherein the shot circulation conduit is configured to accelerate the ferrous solid shot peening particles before passing by the microwave flow sensor;
   a media flow valve coupled to the microwave flow sensor for regulating the flow rate;
   wherein the media flow valve comprises:
      a holder having a through hole for aligning with the shot circulation conduit in order to transfer the ferrous solid shot peening particles via the through hole; and
      a shutter supported by the holder; wherein the shutter is movable with respect to the holder for adjusting size of an opening in order to regulate flow of the shot peening particles; and
      a spreader for altering distribution pattern of the ferrous solid shot peening particles; and
   a core assembly configured to regulate the media travelling in the media flow valve.

2. The media dosage unit of claim 1 further comprising an observation window for inspecting interior of the media dosage unit visually.

3. The media dosage unit of claim 1, wherein the media flow valve is configured to close passage of the shot circulation conduit in the absence of power supply.

4. The media dosage unit of claim 1, wherein the holder of the media flow valve comprises the spreader, wherein the spreader is removable from the holder of the media flow valve.

5. The media dosage unit of claim 1, wherein the shutter comprises a top plate and a valve pulley joined together for moving the top plate with respect to the holder.

6. The media dosage unit of claim 1, wherein the shutter comprises a top plate for providing a non-levelled surface in order to prevent accumulation of the ferrous solid shot peening particles at the shutter.

7. The media dosage unit of claim 1 further comprising a hopper connected to the media flow valve, the microwave flow sensor or both for feeding the ferrous solid shot peening particles in a constant flow rate.

8. The media dosage unit of claim 1 further comprising a protective casing for preventing external disturbance to internal components of the media dosage unit.

9. The media dosage unit of claim 1 further comprising a shot media storage tank for keeping the ferrous solid shot peening particles as shot media, the shot media storage tank connected to the shot circulation conduit.

\* \* \* \* \*